(12) United States Patent
Goldman

(10) Patent No.: US 11,625,051 B2
(45) Date of Patent: Apr. 11, 2023

(54) PROACTIVE GENERATION OF TUNING DATA FOR AUTONOMOUS VEHICLE DISPATCH

(71) Applicant: Uber Technologies, Inc., San Francisco, CA (US)

(72) Inventor: Brent Goldman, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 441 days.

(21) Appl. No.: 16/750,773

(22) Filed: Jan. 23, 2020

(65) Prior Publication Data

US 2020/0241564 A1 Jul. 30, 2020

Related U.S. Application Data

(60) Provisional application No. 62/823,594, filed on Mar. 25, 2019, provisional application No. 62/796,890, filed on Jan. 25, 2019.

(51) Int. Cl.
G05D 1/02 (2020.01)

(52) U.S. Cl.
CPC ......... *G05D 1/0297* (2013.01); *G05D 1/0221* (2013.01); *G05D 2201/0213* (2013.01)

(58) Field of Classification Search
CPC combination set(s) only.
See application file for complete search history.

(56) References Cited

U.S. PATENT DOCUMENTS

| | | | |
|---|---|---|---|
| 10,026,506 B1 * | 7/2018 | LaBorde | G06N 3/0481 |
| 11,079,245 B1 * | 8/2021 | Niewiadomski | G01C 21/3492 |
| 2016/0229404 A1 * | 8/2016 | Byun | H04W 4/21 |
| 2017/0097238 A1 * | 4/2017 | Pfeifle | G06F 16/2219 |
| 2017/0123421 A1 * | 5/2017 | Kentley | G06Q 10/00 |
| 2017/0131108 A1 * | 5/2017 | Kitchel | G01C 21/20 |
| 2017/0136842 A1 * | 5/2017 | Anderson | B60N 2/0244 |
| 2017/0286884 A1 * | 10/2017 | Shoval | G06Q 50/30 |
| 2018/0276609 A1 * | 9/2018 | Seaman | G06Q 10/0832 |
| 2018/0315146 A1 * | 11/2018 | Matthiesen | G01C 21/3453 |
| 2018/0372502 A1 * | 12/2018 | Rønnow | G01C 21/3446 |
| 2019/0026671 A1 * | 1/2019 | Al Falasi | G01C 21/3438 |
| 2019/0265045 A1 * | 8/2019 | Baik | G01C 21/3841 |
| 2019/0311613 A1 * | 10/2019 | Johnson | G08G 1/0112 |
| 2020/0056901 A1 * | 2/2020 | Engle | B60W 60/0013 |
| 2020/0166928 A1 * | 5/2020 | Sudarsan | G06V 20/52 |
| 2020/0255028 A1 * | 8/2020 | Raichelgauz | B60W 60/0013 |
| 2020/0317216 A1 * | 10/2020 | Konrardy | B60W 30/182 |
| 2021/0172751 A1 * | 6/2021 | Balva | G06F 3/0482 |

\* cited by examiner

*Primary Examiner* — Anne Marie Antonucci
*Assistant Examiner* — Amelia Vorce
(74) *Attorney, Agent, or Firm* — Schwegman Lundberg & Woessner, P.A.

(57) ABSTRACT

A method for dispatching trips to a plurality of autonomous vehicles is disclosed. Operational design domain (ODD) parameters for an autonomous vehicle of a first vehicle type are derived based on vehicle movement data. The vehicle movement data describes a plurality of trips executed by a set of autonomous vehicles of the first vehicle type. A first ODD parameter of the ODD parameters is identified that meets a criterion. A first new trip is generated based on the identified ODD parameter. An autonomous vehicle is selected to execute the first new trip. A request to execute the first new trip is then sent to the selected autonomous vehicle.

20 Claims, 12 Drawing Sheets

PROACTIVE GENERATION OF TUNING DATA FOR AUTONOMOUS VEHICLE DISPATCH

CROSS REFERENCE TO RELATED APPLICATION

This application claims priority to U.S. Provisional Application No. 62/796,890 filed Jan. 25, 2019, entitled "DETERMINATION OF THIRD-PARTY VEHICLE CAPABILITIES" and U.S. Provisional Application No. 62/823,594, filed Mar. 25, 2019, entitled "PROACTIVE GENERATION OF TUNING DATA FOR AUTONOMOUS VEHICLE DISPATCH." The contents of these prior applications are considered part of this application and are hereby incorporated by reference in their entireties.

FIELD

This document pertains generally, but not by way of limitation, to devices, systems, and methods for operating and/or managing an autonomous vehicle.

BACKGROUND

An autonomous vehicle is a vehicle that is capable of sensing its environment and operating some or all of the vehicle's controls based on the sensed environment. An autonomous vehicle includes sensors that capture signals describing the environment surrounding the vehicle. The autonomous vehicle processes the captured sensor signals to comprehend the environment and automatically operates some or all of the vehicle's controls based on the resulting information.

DRAWINGS

In the drawings, which are not necessarily drawn to scale, like numerals may describe similar components in different views. Like numerals having different letter suffixes may represent different instances of similar components. Some embodiments are illustrated by way of example, and not of limitation, in the figures of the accompanying drawings.

DESCRIPTION

Figure 1:
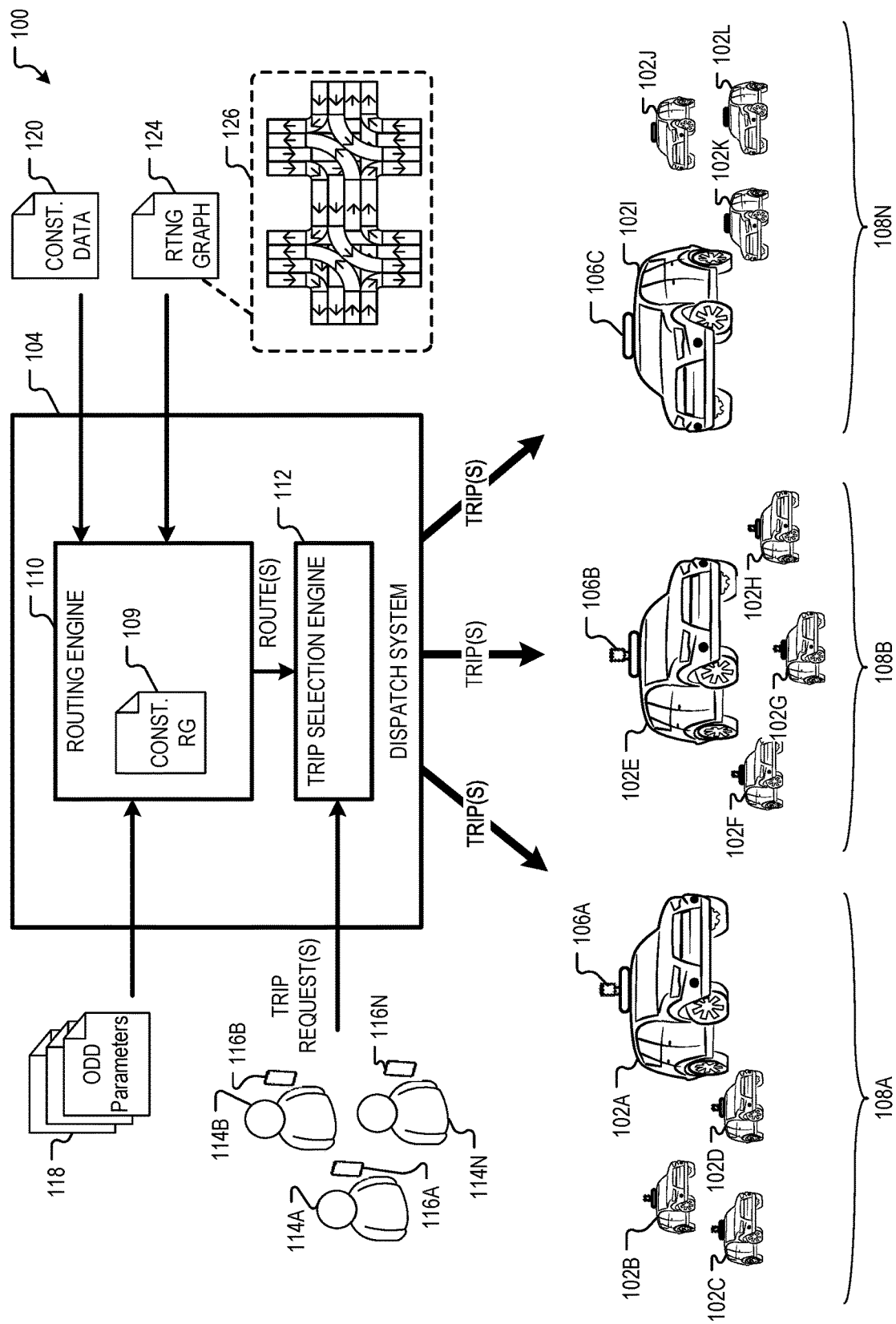
FIG. 1 is a diagram showing one example of an environment for tuning a dispatch system based on the performance of autonomous vehicles.

Examples described herein are directed to systems and methods for deriving operational domain data (ODD) for autonomous vehicles. The ODD data describes an operational environment in which an autonomous vehicle may safely operate. For example, the ODD data may indicate whether an autonomous vehicle may operate in heavy fog, make unprotected left turns, or operate off road. In some cases, ODD data for a particular type of autonomous vehicle available to a dispatch system is incomplete or inaccurate in one or more dimensions. The disclosed embodiments provide methods for augmenting or correcting available ODD data for a particular AV type, such that the dispatch system has a more accurate understanding of an AV's capabilities and limitations. This can provide for improved safety when the AV of the particular type are operated, as the dispatch system may tailor trips to the AV of the particular type based on the AV's capabilities and limitations as defined by the ODD data.

In an autonomous or semi-autonomous vehicle (collectively referred to as an autonomous vehicle (AV)), a vehicle autonomy system, sometimes referred to as an AV stack, controls one or more of braking, steering, or throttle of the vehicle. In a fully-autonomous vehicle, the vehicle autonomy system assumes full control of the vehicle. In a semi-autonomous vehicle, the vehicle autonomy system assumes a portion of the vehicle control, with a human user (e.g., a vehicle operator) still providing some control input. Some autonomous vehicles can also operate in a manual mode, in which a human user provides all control inputs to the vehicle.

An autonomous vehicle executes a trip by traversing from a trip start point to a trip end point. For some trips, the vehicle picks up a passenger or cargo at the vehicle start point and drops off the passenger or cargo at the trip end point. Not all trips include passengers however. In some embodiments, a trip may be generated to cause a vehicle to traverse a particular route that includes particular route segments of interest. For example, a trip may be generated to gather data as to whether a particular vehicle type is capable of traversing a route including one or more characteristics or features (e.g. unsupervised left turn, traffic circle).

Also, some trips include waypoints. Waypoints are positions where the autonomous vehicle passes and/or stops between the trip start point and the trip end point. A vehicle stops at one or more waypoints to pick up or drop off passengers and/or cargo or can pass through a waypoint without stopping.

The dispatch system selects an autonomous vehicle for a trip, at least in part, by generating routes for multiple autonomous vehicles that are candidates to execute the trip. A route is a path that an autonomous vehicle takes, or plans to take, over one or more roadways. The dispatch system uses the generated routes to select the candidate autonomous vehicle that is best suited to execute a trip. For example, the generated routes can indicate when different autonomous vehicles can arrive at the trip start point to begin the trip, how the autonomous vehicles will travel between the trip start point and trip end point, how long it will take the autonomous vehicles to complete the trip, etc. In some examples, the autonomous vehicle best suited to a trip is the autonomous vehicle that can complete the trip at the lowest total cost, where cost is determined based on travel time, risk of adverse events, and/or other factors as described herein.

In some examples, the dispatch system dispatches trips to autonomous vehicles of different types having different capabilities. For example, one type of autonomous vehicle is capable of executing unprotected left turns while another type may have limited capabilities in that regard. Also, for example, one type of autonomous vehicle may have a maximum speed of 45 miles per hour (mph) while another may have a higher maximum speed. When the dispatch system generates a route for an autonomous vehicle to execute a trip, the route (including the cost to execute the route) can reflect the capabilities of the autonomous vehicle. In this way, the dispatch system can consider the different capabilities of autonomous vehicles of different types when selecting an autonomous vehicle to execute a trip.

In some examples, the dispatch system learns about the capabilities of different types of autonomous vehicles using vehicle capability data provided by the manufacturer or other party associated with a type of autonomous vehicle. In some examples, the vehicle capability data is referred to as operational domain (OD) or operational design domain (ODD) data. ODD data may describe particular capabilities of an autonomous vehicle type. For example, ODD data may describe properties of route components that the vehicle is capable of or not capable of traversing and/or other constraints on vehicle operation. Operation domain (OD) data may represent particular portions or segments of a route that may or may not be navigable by a particular autonomous vehicle type based on the ODD data. For example, if a particular autonomous vehicle type is unable to perform unprotected left turns, OD data for this particular autonomous vehicle type may indicate that a map segment for an intersection at main street and elm street in small town, U.S.A. may not be navigable by the particular AV type because it includes an unprotected left turn.

In some examples, however, vehicle capability data can be incomplete or incorrect. For example, some vehicle types may not have associated vehicle capability data. Also, in some examples, vehicle capability data provided by a vehicle manufacturer or other associated party may not be completely correct. For example, a first type of autonomous vehicle may have vehicle capability data indicating that it can handle unprotected left turns with oncoming traffic traveling at 35 mph or less. In practice, however, vehicles of the first type may require intervention at an unacceptably high percentage of unprotected left turns, even when oncoming traffic is traveling at 35 mph or less.

Various examples described herein address these and other issues utilizing a dispatch system that is programmed to determine and apply routing constraints to vehicles of a particular vehicle type. A routing constraint changes the connectivity and/or the cost of route components in a routing graph used to generate routes.

Some embodiments may determine that a particular portion of ODD data for a particular type of autonomous vehicle is incomplete or at an accuracy level that is below a nominal level. To improve the completeness and/or accuracy of the ODD data for the particular AV type, the disclosed embodiments may generate and then request one or more trips from vehicles of the particular AV type. In some embodiments, the trips are generated to cause an autonomous vehicle to demonstrate a capability that relates to a portion of the ODD data that is incomplete or less accurate than desired.

These requests are either accepted or denied by the vehicle. Whether the requests are accepted or denied may serve as an indicator of whether vehicles of the particular AV type are capable of performing along a route indicated by the request. This information is used to complement and/or further complete the ODD data for vehicles of the particular AV type.

In some embodiments, accepted trips are monitored by the disclosed embodiments as they progress. The monitoring may facilitate an understanding of how the vehicle completes the trip. For example, in some embodiments, the trip is monitored to understand what route segments are selected for use during the trip, speeds maintained by the AV vehicle, deviations from a planned route, and other discretionary choices the AV may make during the trip. From this information, along, in some cases, with data obtained from additional trips performed by vehicles of the particular AV type, ODD data for vehicles of the particular AV type are augmented and/or completed. This improved data may then be used to generate routes for vehicles of the particular AV type. As described herein, the generated routes are used to select vehicles to execute trips.

FIG. 1 is a diagram showing one example of an environment 100 for tuning a dispatch system 104 based on the performance of autonomous vehicles. The environment includes a dispatch system 104 and vehicles 102A-L of different types. The vehicles 102 A-L can be passenger vehicles, such as trucks, cars, buses or other similar vehicles. The vehicles 102 A-L can also include delivery vehicles, such as vans, trucks, tractor trailers, etc. The vehicles 102A-L are self-driving vehicles (SDVs) or autonomous vehicles (AVs). For example, each of the vehicles 102 A-L includes a vehicle autonomy system, described in more detail with respect to FIG. 2, that is configured to operate some or all the controls of the vehicle 102A-L (e.g., acceleration, braking, steering). Note that while the vehicles in FIG. 1 are identified as vehicles 102A-L, this disclosure may refer to a generic vehicle as vehicle 102, which can include any of the vehicles 102A-L.

In some examples, one or more of the vehicles 102A-L is operable in different modes where the vehicle autonomy system has differing levels of control over a vehicle 102 in different modes. In some embodiments, some of the vehicles 102A-L are operable in a full autonomous mode in which the vehicle autonomy system has responsibility for all or most of the controls of a vehicle 102. In at least some of these embodiments, some vehicles 102A-L are operable in a semiautonomous mode that is in addition to or instead of the full autonomous mode. In a semiautonomous mode, the vehicle autonomy system of a vehicle 102 is responsible for some of the vehicle controls while a human user or driver is responsible for other vehicle controls. In some examples, one or more of the vehicles 102A-L is operable in a manual mode in which the human user is responsible for all control of the vehicle 102. Additional details of an example vehicle autonomy system are provided herein with reference to FIG. 2.

The vehicles 102A-L include one or more remote detection sensor sets 106A-C. (Each of the vehicles 102A-L may have a respective remote detection sensor set although, for clarity, not all of the remote detection sensor sets 106A-C are individually labeled). Remote detection sensor sets 106A-C include one or more remote detection sensors that receive return signals from the environment 100. Return signals are reflected from objects in the environment 100, such as the ground, buildings, trees, etc. The remote-detection sensor sets 106 may include one or more active sensors, such as light imaging detection and ranging (LIDAR), radio detection and ranging (RADAR), and/or sound navigation and ranging (SONAR) that emit sound or electromagnetic radiation in the form of light or radio waves to generate return signals. Information about the environment 100 is extracted from the return signals. In some examples, the remote-detection sensor sets 106A-C include one or more passive sensors that receive return signals that originated from other sources of sound or electromagnetic radiation. Remote-detection sensor sets 106A-C provide remote sensor data that describes the environment 100. The vehicles 102A-L can also include other types of sensors, for example, as described in more detail with respect to FIG. 2.

The environment 100 shows vehicles 102A-L of three different vehicle types 108A, 108B, 108N. Although three different vehicle types 108A, 108B, 108N are shown in FIG. 1, the dispatch system 104 can be configured to dispatch trips to more or fewer different vehicle types.

In some examples, the different types 108A, 108B, 108N of vehicles 102 have different capabilities. For example, different types 108A, 108B, 108N of vehicles 102 can have different vehicle autonomy systems. This can include, for example, vehicle autonomy systems created by different manufacturers or designers, vehicle autonomy systems having different software versions or revisions, etc. Also, in some examples, different types 108A, 108B, 108N of vehicles 102 can have different remote sensor sets 106A-C. For example, one type 108A of vehicles 102 may include a LIDAR remote sensor while another type 108N of vehicle 102 may include stereoscopic cameras and omit a LIDAR remote sensor. In some examples, different types 108A, 108B, 108N of vehicles 102 can also have different mechanical particulars. For example, one type 108A of vehicle may have all-wheel drive while another type 108B may have front-wheel drive.

The dispatch system 104 is programmed to assign trips to the vehicles 102 as described herein. The dispatch system 104 can be or include one or more servers or other suitable computing devices. The dispatch system 104 is configured to receive trip requests from one or more users 114A, 114B, 114N. Users 114A, 114B, 114N can make trip requests with user computing devices 116A, 116B, 116N. The user computing devices 116A, 116B, 116N can be or include any suitable computing device such as, for example, tablet computers, mobile telephone devices, laptop computers, desktop computers, etc. In some examples, user computing devices 116A, 116B, 116N execute an application associated with a transportation service implemented with the dispatch system 104. The users 114A, 114B, 114N launch the application on the respective computing devices 116A, 116B, 116N and utilize functionality of the application to make trip requests.

The dispatch system 104 comprises a trip selection engine 112 that is programmed to receive and process trip requests and a routing engine 110 that generates routes for candidate autonomous vehicles 102 to execute a requested trip. When the trip selection engine 112 receives a trip request, it identifies a set of candidate autonomous vehicles 102 for executing the trip. The set of candidate autonomous vehicles 102 can include autonomous vehicles 102 that are best suited for executing the trip. For example, the set of candidate autonomous vehicles 102 can include autonomous vehicles 102 that are near to a trip start point. In some examples, candidate autonomous vehicles are limited to vehicles capable of executing the trip. For example, a trip that involves moving a large cargo object is executable only by autonomous vehicles having sufficient space to carry the large object. A trip that involves moving, for example, five passengers is executable only by autonomous vehicles having sufficient space to carry five passengers.

The trip selection engine 112 provides an indication of the candidate autonomous vehicles 102 to the routing engine 110. The routing engine 110 generates candidate routes for some or all of the set of candidate autonomous vehicles 102. The candidate routes are described by respective route costs. The trip selection engine 112 uses the candidate routes to select the autonomous vehicle 102 best suited to execute the route. For example, the candidate autonomous vehicle 102 best suited to execute the route is the candidate autonomous vehicle 102 having the lowest cost route for the trip in at least some embodiments.

In some examples, the trip selection engine 112 uses type-metrics associated with particular types 108A, 108B, 108N of autonomous vehicles 102 in addition to or instead of the candidate routes to select an autonomous vehicle 102 for executing a trip. The trip selection engine 112 can weigh the cost of the candidate routes based on type metrics associated with the candidate autonomous vehicles 102. Non-limiting examples of type-specific metrics are described below:

Estimated Time of Arrival (ETA):

ETA describes the time between the when a trip is requested and when an autonomous vehicle 102 arrives at the trip start point (e.g., to pick up a passenger or cargo). Different types 108A, 108B, 108N of autonomous vehicles 102 may consistently exhibit higher or lower ETAs. For example, some types 108A, 108B, 108N of autonomous vehicles 102 respond slower or faster to a trip request from the dispatch system 104. The trip selection engine 112 may weight candidate route costs to favor types 108A, 108B, 108N with lower average ETAs, for example, as indicated by constraint data 120.

Estimated Time of Dropoff (ETD):

ETD can describe the average time between when a trip is requested and when the autonomous vehicle 102 completes the trip by arriving at the trip end point (e.g., to drop off a passenger or cargo). The trip selection engine 112 may weight candidate route costs to favor types 108A, 108B, 108N with lower average ETDs, for example, as indicated by constraint data 120.

Price:

Different types 108A, 108B, 108N of autonomous vehicles 102 can be associated with providers who charge different rates for trips. In some examples, the trip selection engine 112 may weight candidate route costs to favor types 108A, 108B, 108N that have a lower cost.

Average Customer Rating:

Customer ratings can be used to generate routing graph constraints, as described herein. In some examples, though, the trip selection engine 112 uses an average customer rating for a type 108A, 108B, 108N of autonomous vehicle 102 in addition to candidate routes to select an autonomous vehicle 102 for executing a route. The trip selection engine 112 may weight candidate route costs to favor types 108A, 108B, 108N having higher average customer ratings.

Availability:

Different types 108A, 108B, 108N of autonomous vehicles 102 can have different availability for receiving trips. Availability can be expressed, for example, as a time that an autonomous vehicle 102 is available for accepting trips over a given period (e.g., hours per week, hours per month, etc.). For example, some types 108A, 108B, 108N of autonomous vehicles 102 may suffer mechanical down time more often than others. The trip selection engine 112 may weight candidate route costs to favor types 108A, 108B, 108N that have a higher availability.

Utilization:

Utilization describes the time that an autonomous vehicle 102 is executing a trip over the total time that the autonomous vehicle 102 is available to accept trips. The trip selection engine 112 may weight candidate route costs to favor types 108A, 108B, 108N with a higher utilization.

Acceptance Rate:

Acceptance rate describes the portion of trips offered to an autonomous vehicle 102 that are accepted by the autonomous vehicle 102. The trip selection engine 112 may weight candidate route costs to favor types 108A, 108B, 108N with higher acceptance rates.

Cost/Mile:

Cost per mile reflects the cost per mile (or per another unit distance) of operating an autonomous vehicle 102. This can be affected, for example, by fuel mileage, maintenance costs, landscape and terrain, etc. The trip selection engine 112 may weight candidate route costs to favor types 108A, 108B, 108N having the lower costs per mile. Also, in some examples, cost per mile can be described both for times when an autonomous vehicle 102 is on a trip and for times when an autonomous vehicle 102 is off a trip.

Vehicle Capability Data:

In some examples, the trip selection engine 112 weights candidate route costs to favor types 108A, 108B, 108N for which the dispatch system 104 has more complete vehicle capability data. As described herein, vehicle capability data can be received from a manufacturer of a type 108A, 108B, 108N of autonomous vehicle 102 as OD or ODD data and/or derived, as described herein, from constraint data 120. The trip selection engine 112 may favor types 108A, 108B, 108N for which it has more vehicle capability data, for example, because those types may be more predictable.

In some examples, the dispatch system 104 is configured to consider selecting non-autonomous vehicles to execute trips. If a non-autonomous vehicle is selected as a candidate vehicle, the routing engine 110 generates a candidate route for that vehicle, for example, as described herein. In some examples, the trip selection engine 112 considers additional type metrics related to non-autonomous vehicles such as, for example, a retention rate describing the number of human drivers who are active in a given time period (e.g., month or year). For example, the selection engine 112 may weight candidate route costs to maximize the number of human drivers who are active in a given time period. Another example type metric related to non-autonomous vehicles is driver earnings (e.g., hourly earnings). For example, the selection engine 112 may weight candidate route costs to maximize the hourly earnings of human drivers.

It will be appreciated that the type metrics described herein are examples. Additional type metrics and/or modifications of the type metrics described herein are used in some embodiments. Also, in some examples, the trip selection engine 112 can consider other type metrics not specifically described.

When the trip select engine 112 selects an autonomous vehicle 102 (or non-autonomous vehicle) for a trip, the trip selection engine 112 sends a trip execution request to the selected autonomous vehicle 102. The selected autonomous vehicle 102 can accept or decline the trip. If the selected autonomous vehicle 102 accepts the trip, the vehicle autonomy system of that autonomous vehicle 102 begins to control the vehicle towards the trip start point to execute the trip. If the selected autonomous vehicle 102 declines the trip, the trip selection engine 112 can select a next candidate autonomous vehicle 102 to execute the trip, for example, by selecting the candidate autonomous vehicle 102 with the next-lowest cost route for executing the trip.

The routing engine 110 generates routes utilizing, for example, a routing graph 124 in conjunction with constraint data 120 such as, for example, policy data, vehicle capability data, and/or operational constraint data. The routing graph 124 is a representation of the roadways in a geographic area. The routing graph 124 can represent the roadways as a set of route components, which are sometimes also referred to as lane segments. In some examples, the routing graph 124 indicates directionality, connectivity, and cost for the various route components making up the roadways. Directionality indicates the direction of travel in a route component. Connectivity describes route component connections indicating possible transitions between route components. Cost describes the cost for an autonomous vehicle 102 to traverse a route component.

In FIG. 1, break-out window 126 shows example route components making up part of the routing graph 124. Route components in the break-out window 126 are illustrated as shapes with arrows indicating the directionality of the route components. Route components can be connected to one another according to their directionality.

The routing engine 110 is configured to utilize vehicle ODD parameter data 118 and/or other constraint data 120 to generate constrained routing graph data 109. Vehicle ODD parameter data 118 and other constraint data 120 indicates constraints that are applied to the routing graph to generate the constrained routing graph 109. Generally, a constraint includes a constraint property or set of constraint properties describing route components subject to the constraint and one or more routing graph modifications for implementing the constraint. Routing graph modifications can include, for example, removing route components having the indicated property or properties from the routing graph, removing route component connections to route components having the indicated property or properties from the routing graph. Another example routing graph modification can include changing a cost associated with route component (e.g., a route component cost) and/or transitions to the route component.

In some embodiments, costs are adjusted. For example, in some embodiments, if constraint data indicates that route components having a particular property or set of properties are disfavored, the costs to traverse and/or transition to the route components can be increased. On the other hand, in these embodiments, if constraint data indicates that route components having a particular constraint property or set of constraint properties are favored, the costs to traverse and/or transition to the route components can be decreased.

Routing graph modifications can relate to route components that have the indicated constraint property or properties. For example, if a policy constraint forbids routing a vehicle through route components that include or are in a school zone, a corresponding routing graph modification includes removing such school zone route components from the routing graph 124 and/or removing transitions to such school zone route components. Routing graph modifications can, in some examples, describe changes to route components other than those having the identified properties. Consider an example constraint that is to avoid cul-de-sacs. The associated routing graph modification could involve removing route components that include cul-de-sacs and also removing route components that do not include cul-de-sacs but can lead only to other route components that include cul-de-sacs.

Vehicle ODD data 118 describes capabilities associated with various autonomous vehicles 102 of different types 108A, 108B, 108N. For example, the vehicle ODD data 118 can be and/or be derived from data, if any, provided by the vehicle's manufacturer. As described herein, vehicle ODD data 118 can be supplemented using constraint data 120 to cause the vehicle ODD data 118 to more closely match the actual performance of autonomous vehicles 102 of the various types 108A, 108B, 108N.

Constraints described by vehicle constraint data 120 can include constraint data identifying a route segment property or properties (e.g., includes an unprotected left, is part of a controlled access highway, etc.) and routing graph modification data indicating what is to be done to route components having the indicated property or properties. For example, route components that a particular vehicle type 108A, 108B, 108N is not capable of traversing can be removed from the routing graph or can have connectivity data modified to remove transitions to those route components. For example, the dispatch system 104 can remove one or more connections to the route component. If the route component properties indicate a maneuver that is undesirable for a vehicle, but not forbidden, then the routing graph modification data can call for increasing the cost of an identified route component or transitions thereto.

Other constraint data 120 can describe other constraints utilized to generate the constrained routing graph 109. For example, other constraint data 120 can include policy constraints. Policy constraints include route component properties that identify route components subject to a policy constraint and corresponding routing graph modifications. Policy constraints refer to types of route segments that it is desirable for a vehicle to avoid or prioritize. An example policy constraint is to avoid route components that are in or pass through school zones. Another example policy constraint is to avoid routing vehicles in residential neighborhoods. Yet another example policy constraint is to favor routing vehicles on controlled-access highways, if available. Policy constraints can apply to some vehicles, some vehicle types, all vehicles, or all vehicle types.

In some examples, other constraint data 120 also describes operational constraints. An operational constraint can include a set of route component properties and associated routing graph modifications. Operational constraints can be based, for example, on the state of one or more roadways. For example, if a roadway is to be closed for a parade or for construction, an operational constraint identifies properties (e.g., names or locations) of route segments that are part of the closure and an associated routing graph modification (e.g., removing the route components, removing transitions to the route components, etc.).

In some examples, other constraint data 120 may describe constraints of a particular type of autonomous vehicle based on observations of a performance of that particular type of autonomous vehicle. For example, the disclosed embodiments may observe that a particular type of autonomous vehicle avoids left turns with speeds above a speed threshold. If these observations meet certain quality criterion, the disclosed embodiments may add a constraint to the constraint data 120 indicating that the particular type of autonomous vehicle is not to be routed over routes having these characteristics.

The routing engine 110 applies constraint data 120 to generate a constrained routing graph 109. The constrained routing graph 109 is used to generate a route for an autonomous vehicle 102. (In some examples, different constrained routing graphs 109 are generated for different types 108A, 108B, 108N of autonomous vehicles 102.) The routing engine 110 determines a route for an autonomous vehicle 102, for example, by applying a path planning algorithm to the constrained routing graph 109 to find the lowest cost route for the vehicle. Any suitable path planning algorithm can be used, such as, for example, A*, D*, Focused D*, D* Lite, GD*, or Dijkstra's algorithm. A generated route can include a string of connected route components between a vehicle start point and a vehicle end point. A vehicle start point is an initial route component of a route. A vehicle end point is a last route component of a route. In some examples, the vehicle start point is a current location of the relevant autonomous vehicle 102 and the vehicle end point is the end point for the requested trip. For example, on the route, the autonomous vehicle 102 can travel from its current location, to the trip start point, and then proceed to the trip end point traversing trip waypoints (if any) along the way.

The routing engine 110, in some examples, generates the constrained routing graph 109 at different times during route generation. In some examples, the routing engine 110 receives a request to generate a route for a particular autonomous vehicle 102. The routing engine 110 responds by accessing the current constraints for the autonomous vehicle 102 (e.g., vehicle ODD data 118 and other constraint data 120). The routing engine 110 applies the constraints to the routing graph 124 to generate the constrained routing graph 109 and then uses the constrained routing graph 109 to generate a route.

In another example, the routing engine 110 generates the constrained routing graph 109 on an as-needed basis. For example, various path planning algorithms described herein operate using graph expansion. To apply a graph expansion-type algorithm, the routing engine 110 begins at an algorithm start point and expands along allowable transitions to string together connected route components. The algorithm is complete when one or more of the strings of connected route components has an allowable transition to or from an algorithm end point. Many graph expansion algorithms can be applied forwards (e.g., from a vehicle start point to a vehicle end point) or backwards (e.g., from a vehicle end point to a vehicle start point).

To generate a constrained routing graph 109 on an as-needed basis, the routing engine 110 can request a subset of the constrained routing graph 109 while route expansion is being performed. For example, the routing engine 110 can determine a first portion of a route including a string of connected route components. The routing engine 110 can then request constrained routing graph 109 data describing a set of route components that can be transitioned to the last route component of the string (or a set of route components from which a vehicle can transition to the last route component of the string if the algorithm is applied backwards). In this way, the routing engine 110 may not need to apply the constraint data to all route components of the grouting graph 124 but, instead, only to the route components used by the path planning algorithm.

Figure 2:
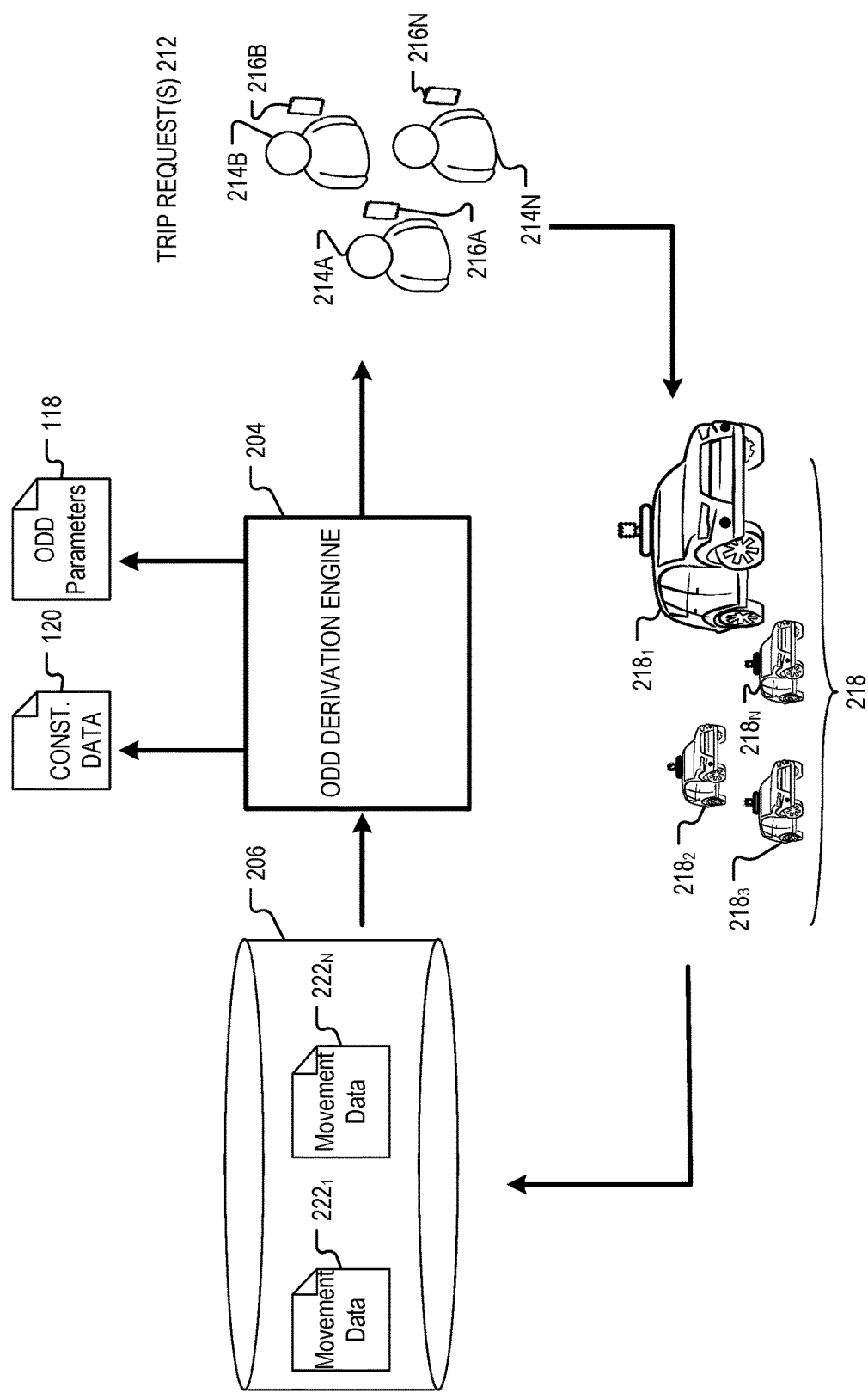
FIG. 2 is a diagram showing one example of an environment for deriving ODD parameters based on the performance of autonomous vehicles.

FIG. 2 is a block diagram of a constraint generation system 200. The constraint generation system 200 includes an ODD derivation engine 204. The ODD derivation engine 204 receives data from a vehicle movement data repository 206, and original equipment manufacturer data store 208.

Vehicle movement data $222_{1 \ldots n}$ describes the results of trips executed by autonomous vehicles 102 of different types 108A 108B, 108N. Vehicle movement data $222_{1 \ldots n}$ can include various information about a trip including, for example, an actual route traversed by the autonomous vehicle 102 to execute the nip and various events that occurred on the trip. The vehicle movement data $222_1 \ldots _n$ include position coordinates of the vehicle as it moves. In some cases, the position coordinates are captured while the vehicle is performing a trip assigned to it. In some cases, the position coordinates are captured when the vehicle is moving between two assigned trips (e.g. from a destination of a first trip to an origin location of a second trip). In some other cases, the position coordinates are captured when the vehicle is completing a route assigned to it. The route Wray not be part of a trip but may instead be assigned to it to gather additional information on the vehicle's capabilities.

Various different types of events can occur on a trip and be described by vehicle movement data $222_1 \ldots _n$. One example event that can occur on a trip is an intervention. An intervention occurs when the vehicle autonomy system of an autonomous vehicle 102 ceases to control the vehicle 102. This can occur, for example, if the vehicle autonomy system crashes, if the autonomous vehicle 102 encounters a road condition through which it cannot direct the vehicle, if the autonomous vehicle 102 encounters a route segment, etc. In some examples, the autonomous vehicle 102 carries a human user who can assume control upon the occurrence of an intervention. Also, in some examples, the autonomous vehicle 102 is configured to pull to a safe stopping location upon the occurrence of an intervention.

Another example event that can occur on a trip is receiving a passenger rating below a passenger rating threshold. In some examples, users 114A, 114B, 114N can provide a passenger rating for a trip, e.g., after the trip is executed. A passenger rating indicates a user's level of satisfaction with a trip.

Yet another example of an event that can occur on a trip is a deviation from a planned route. For example, when dispatch system 104 requests that an autonomous vehicle 102 execute a route, it may provide the route for the selected autonomous vehicle 102 generated by the routing engine 110. The autonomous vehicle 102, for various reasons, may deviate from this route. For example, the autonomous vehicle 102 can include and/or be in communication with another routing engine and/or other component that can route the vehicle 102. The autonomous vehicle 102 can disregard the received route generated by the routing engine 110 and/or deviate from the received route.

Another example event that can occur with a trip is when an autonomous vehicle 102 declines a trip. An autonomous vehicle 102 can decline a trip for various reasons including, for example, if the autonomous vehicle 102 determines that the trip will cause the autonomous vehicle 102 to traverse a route component that is impassable or otherwise unfavorable to the autonomous vehicle 102.

A further example of an event that can occur on a trip is a deviation from an estimated time of arrival. For example, the routes generated by the routing engine 110 can include an estimated time of arrival for the various autonomous vehicles 102, where the estimated time of arrival indicates when the autonomous vehicle 102 is estimated to complete the trip.

The ODD derivation engine 204 can be configured to generate additional routing constraints for autonomous vehicles 102 of different types 108A, 108B, 108N using the vehicle movement data $222_1 \ldots _n$. The ODD derivation engine 204 can process a vehicle trip by determining whether any events occurred during the trip (e.g., an intervention, a deviation from the generated route, a deviation from an estimated time of arrival, a passenger rating less than a threshold, etc.). In some examples, the ODD derivation engine 204 is programmed to identify events from a predetermined set of event types.

If one or more events occurred during a trip, the ODD derivation engine 204 attempts to associate the event with one or more route components. This can be done in various different ways. In some examples, an event is localized. For example, an intervention occurs at a particular location. One or more route components associated with an intervention can include a route component at which the intervention took place, one or more route components that the vehicle traversed before the intervention took place, etc. Another example of an event that is localized can be a deviation from the route determined by the routing engine 110. Tracing the motion of an autonomous vehicle 102 may make it possible to identify, for example, the last route component or components that the vehicle traversed before leaving the route, the next route or components that the vehicle would have traversed had it not deviated from the route, etc.

In some examples, the vehicle movement data $222_1 \ldots _n$ includes metadata describing where an event took place. For example, a customer rating may include comments or other data that indicate the reasons that the user provided a particular rating. The comment can indicate a particular route component or route component type. For example, a user may provide a customer rating lower than a threshold level and accompany the customer rating with a comment indicating that the vehicle was uncomfortably fast in tight corners. In this example, the ODD derivation engine 204 can identify one or more route components with corners tighter than a threshold level and associate these one or more route components with the event.

In examples where an event is not localized or does not include metadata describing where the event took place, the ODD derivation engine 204 can cross-reference the trip to records of other trips executed by autonomous vehicles 102 of the same type 108A, 108B, 108N. For example, the ODD derivation engine 204 can look at all trips for which vehicles 102 of one type 108A, 108B, 108N received lower than a threshold passenger rating and identify commonalities. For example, if 40% of the trips taken by autonomous vehicles 102 of the type 108A with a passenger rating less than the threshold include an unprotected left, then the ODD derivation engine 204 can associate route components including an unprotected left with the event.

Upon identifying one or more route components associated with an event, the ODD derivation engine 204 determines if a route component or route component property is associated with an event or event type at greater than a threshold level. If yes, the ODD derivation engine 204 generates a routing constraint for relevant type 108A, 108B, 108N of autonomous vehicle 102. Routing constraints can be for a particular route component or for routing components having a particular property. For example, if a first route component has been associated with interventions for autonomous vehicles 102 of the type 108B at more than a threshold rate, then the ODD derivation engine 204 can generate a routing constraint that increases the cost of the first route component and/or modifies connectivity to remove the first route component from the constrained routing graph 109 for autonomous vehicles 102 of the type 108B. Similarly, if the vehicle movement data $222_1 \ldots _n$ indicates that route components having a first property (e.g., unprotected left) are associated with interventions for autonomous vehicles 102 of the type 108B at more than a threshold rate, then the ODD derivation engine 204 can generate a routing constraint that increases the cost of routing components having the first property and/or a connectivity modification that removes those route components from the constrained routing graph 109 for autonomous vehicles 102 of the type 108B.

Routing constraints generated using the vehicle movement data $222_{1...n}$ can be positive or negative. For example, some events indicate that an autonomous vehicle 102 is executing trips better than would be expected from the associated vehicle ODD data 118. For example, if autonomous vehicles 102 of type 108N are deviating from provided routes and arriving earlier than expected at more than a threshold portion of trips that include a particular route component or route components having a particular property, the ODD derivation engine 204 can lower the cost of the relevant route component or components.

In some embodiments, the ODD derivation engine 204 is further configured to determine vehicle movement data that is missing from the vehicle movement data repository 206. In other words, via a variety of techniques, the ODD derivation engine 204 may determine that certain ODD parameters cannot be determined for one or more AV types because vehicle movement data providing information for the derivation of the ODD parameters is not present in the vehicle movement data repository 206. Alternatively, the ODD derivation engine 204 may determine that a specificity or a number of ODD parameters for one or more AV types meets one or more criterion, such as criterion indicating that the number of ODD parameters or specificity is below a nominal level. In response to this determination, the ODD derivation engine 204 may generate one or more trip requests 212. In some embodiments, the trip requests 212 are generated by real or simulated users $214_{a...n}$ via smart phones or simulated smart phone $216_{a...n}$. The trip requests $216_{1...n}$ are configured by the ODD derivation engine 204 to generate additional trips $218_{1...n}$ and obtain additional vehicle movement data $222_{1...n}$. This may facilitate generating of additional constraint data 120 to improve the number of constraints and/or the specificity of the constraint data 120 for use by the routing engine 110.

Figure 3:
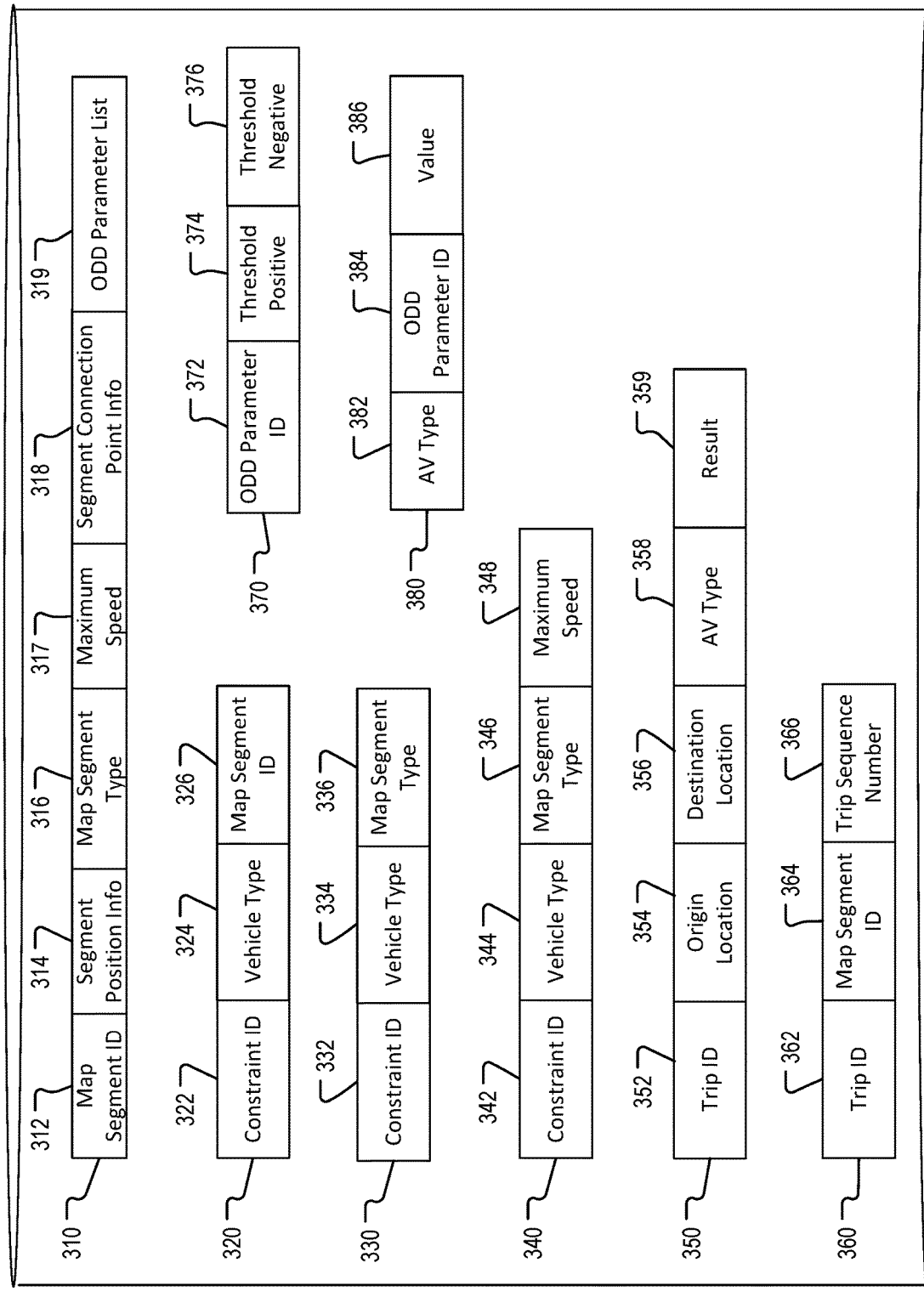
FIG. 3 shows example data structures that may be implemented in some of the disclosed embodiments.

FIG. 3 shows example data structures that are implemented in some embodiments. While the disclosure below refers to the data structures as relational database tables, other implementations of data structures are contemplated for use in the disclosed embodiments. For example, non-structured data stores, and/or in memory structures such as queues or linked lists are utilized in various embodiments.

FIG. 3 shows a map table 310, first constraint table 320, second constraint table 330, and third constraint table 340. The map table 310 includes a map segment identifier field 312, segment position information field 314, map segment type field 316, maximum speed field 318, segment connection point information 318, and an ODD parameter list 319. The map segment identifier field 312 uniquely identifies a particular map segment. The map segment position information field 314 defines a geographic position of the identified map segment. The map segment type field 316 identifies a type of the map segment. The maximum speed field 317 identifies a maximum travel speed of a vehicle within the map segment identified by the field 312. The segment connection point information field 318 defines how the particular map segment connects to other map segments. For example, the field 318 may identify other map segments connected to the segment identified via field 312. The ODD parameter list field 319 identifies zero or more ODD parameters (e.g. 372) whose capability is demonstrated by successful navigation of the map segment (identified via 312).

For example, if the map segment includes an unsupervised left turn and a traffic circle, the ODD parameter list field 319 would identify an ODD parameter indicating whether a vehicle may perform an unsupervised left turn and a second OD parameter indicating whether a vehicle has a capability to navigate a traffic circle.

Each of the first, second, and third constraint tables 320, 330, and 340 respectively store constraints for various vehicle types. The constraints stored in the constraint table 320, 330, and 340 describe restrictions on use of map segments stored in the map table 310. Each of the tables 320, 330, and 340 includes a constraint identifier field (322, 332, 342), a vehicle type field (324, 334, and 344). Each of the constraint tables 320, 330, and 340 vary in the data defining a particular type of constraint stored in each of the tables 320, 330, and 340. The first constraint table 320 stores a map segment id 326, indicating that the constraint indicated by a particular entry in the first constraint table 320 prevents use by an AV type indicated by the vehicle type field 324 of a single map segment identified via the map segment field 326.

The second constraint table 320 stores a map segment type in field 336, indicating that a vehicle type stored in the field 334 is prevented from using any map segment stored in the map table 310 having the indicated map segment type. The third constraint table 340 stores a map segment type field 346 and a maximum speed 348, indicating that a vehicle of the type indicated by the field 344 is prevented from exceeding a speed indicated in the maximum speed field 348 within any map segment having the type indicated by the map segment type field 346.

In some embodiments, the ODD derivation engine 204 discussed above with respect to FIG. 2 is configured to generate one or more constraints and store them in one or more of the first, second or third constraint tables 320, 330, and/or 340.

The trip table 350 includes a trip identifier field 352, origin location field 354, destination location field 356, and an av type field 358. The trip identifier field 352 is a unique identifier for a particular trip. The origin location field 354 indicates an origin location of the trip. The destination location field 356 indicates a destination location for the trip. The AV type field 358 indicates an AV type assigned to the trip. The result field 359 indicates a result of the trip. The result field 359 may indicate whether the trip was successful, or another result.

The trip segment table 360 includes a trip identifier 362, which is cross referenced with the trip identifier 352, a map segment identifier field 364, which is cross referenced with the map segment identifier 312, and a trip sequence number 366, which indicates where in a sequence of map segments this particular map segment (e.g. 364) falls.

The ODD parameter table 370 includes an ODD parameter identifier 372, a positive threshold 374 and a negative threshold 376. The ODD parameter identifier 372 may identify a particular ODD parameter of an AV. For example, the ODD parameter identifier 372 may identify a parameter that influences an AV's ability to turn left, to turn left at unprotected intersections, to navigate traffic circles in England, to operate cooperatively with a cross guard or signal person, or any other capability that is exercised by an AV. The threshold positive field 374 indicates a number of trip results demonstrating performance of the ODD parameter that is needed before the ODD parameter of the AV is set based on vehicle movement data. The threshold negative field 376 indicates a number of trip results demonstrating failure to perform a capability based on the ODD parameter.

The AV type table 380 includes an AV type field 382, ODD parameter id field 384, and a parameter value indication 386. The AV type table 380 indicates ODD parameter values for one or more types of AVs. The ODD parameter field 384 is cross referenced with ODD parameter identifier 372. The ODD parameter value field 386 indicates a value of the ODD parameter indicated by the ODD parameter id field 384. For example, if the ODD parameter controls speed during 90° turns, the value field 386 may indicate the speed, in miles per hour or kilometers per hour.

Figure 4:
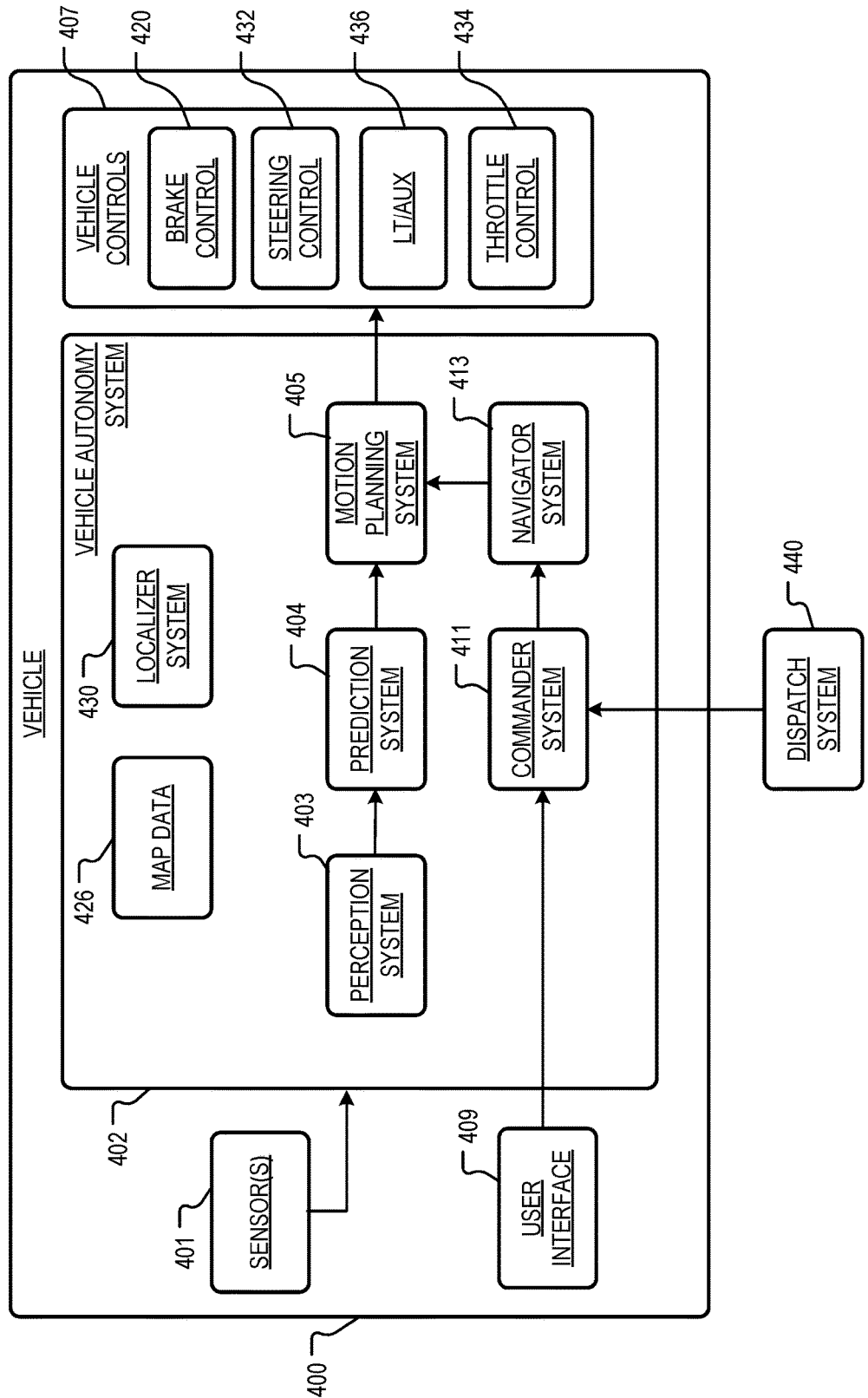
FIG. 4 depicts a block diagram of an example vehicle according to example aspects of the present disclosure.

FIG. 4 depicts a block diagram of an example vehicle 400 according to example aspects of the present disclosure. The vehicle 400 includes one or more sensors 401, a vehicle autonomy system 402, and one or more vehicle controls 407. The vehicle 400 is an autonomous vehicle, as described herein. The example vehicle 400 shows just one example arrangement of an autonomous vehicle. In some examples, autonomous vehicles of different types can have different arrangements.

The vehicle autonomy system 402 includes a commander system 411, a navigator system 413, a perception system 403, a prediction system 404, a motion planning system 405, and a localizer system 430 that cooperate to perceive the surrounding environment of the vehicle 400 and determine a motion plan for controlling the motion of the vehicle 400 accordingly.

The vehicle autonomy system 402 is engaged to control the vehicle 400 or to assist in controlling the vehicle 400. In particular, the vehicle autonomy system 402 receives sensor data from the one or more sensors 401, attempts to comprehend the environment surrounding the vehicle 400 by performing various processing techniques on data collected by the sensors 401, and generates an appropriate route through the environment. The vehicle autonomy system 402 sends commands to control the one or more vehicle controls 407 to operate the vehicle 400 according to the route.

Various portions of the vehicle autonomy system 402 receive sensor data from the one or more sensors 401. For example, the sensors 401 may include remote-detection sensors as well as motion sensors such as an inertial measurement unit (IMU), one or more encoders, or one or more odometers. The sensor data includes information that describes the location of objects within the surrounding environment of the vehicle 400, information that describes the motion of the vehicle 400, etc.

The sensors 401 may also include one or more remote-detection sensors or sensor systems, such as a LIDAR, a RADAR, one or more cameras, etc. As one example, a LIDAR system of the one or more sensors 401 generates sensor data (e.g., remote-detection sensor data) that includes the location (e.g., in three-dimensional space relative to the LIDAR system) of a number of points that correspond to objects that have reflected a ranging laser. For example, the LIDAR system measures distances by measuring the Time of Flight (TOF) that it takes a short laser pulse to travel from the sensor to an object and back, calculating the distance from the known speed of light.

As another example, a RADAR system of the one or more sensors 401 generates sensor data (e.g., remote-detection sensor data) that includes the location (e.g., in three-dimensional space relative to the RADAR system) of a number of points that correspond to objects that have reflected ranging radio waves. For example, radio waves (e.g., pulsed or continuous) transmitted by the RADAR system reflect off an object and return to a receiver of the RADAR system, giving information about the object's location and speed. Thus, a RADAR system provides useful information about the current speed of an object.

As yet another example, one or more cameras of the one or more sensors 401 may generate sensor data (e.g., remote sensor data) including still or moving images. Various processing techniques (e.g., range imaging techniques such as structure from motion, structured light, stereo triangulation, and/or other techniques) can be performed to identify the location (e.g., in three-dimensional space relative to the one or more cameras) of a number of points that correspond to objects that are depicted in an image or images captured by the one or more cameras. Other sensor systems can identify the location of points that correspond to objects as well.

As another example, the one or more sensors 401 can include a positioning system. The positioning system determines a current position of the vehicle 400. The positioning system can be any device or circuitry for analyzing the position of the vehicle 400. For example, the positioning system can determine a position by using one or more of inertial sensors, a satellite positioning system such as a Global Positioning System (GPS), based on IP address, by using triangulation and/or proximity to network access points or other network components (e.g., cellular towers, WiFi access points) and/or other suitable techniques. The position of the vehicle 400 can be used by various systems of the vehicle autonomy system 402.

Thus, the one or more sensors 401 are used to collect sensor data that includes information that describes the location (e.g., in three-dimensional space relative to the vehicle 400) of points that correspond to objects within the surrounding environment of the vehicle 400. In some implementations, the sensors 401 can be positioned at various different locations on the vehicle 400. As an example, in some implementations, one or more cameras and/or LIDAR sensors can be located in a pod or other structure that is mounted on a roof of the vehicle 400 while one or more RADAR sensors can be located in or behind the front and/or rear bumper(s) or body panel(s) of the vehicle 400. As another example, camera(s) can be located at the front or rear bumper(s) of the vehicle 400. Other locations can be used as well.

The localizer system 430 receives some or all of the sensor data from sensors 401 and generates vehicle poses for the vehicle 400. A vehicle pose describes a position and attitude of the vehicle 400. The vehicle pose (or portions thereof) can be used by various other components of the vehicle autonomy system 402 including, for example, the perception system 403, the prediction system 404, the motion planning system 405 and the navigator system 413.

The position of the vehicle 400 is a point in a three-dimensional space. In some examples, the position is described by values for a set of Cartesian coordinates, although any other suitable coordinate system is used in other embodiments. The attitude of the vehicle 400 generally describes the way in which the vehicle 400 is oriented at its position. In some examples, attitude is described by a yaw about the vertical axis, a pitch about a first horizontal axis, and a roll about a second horizontal axis. In some examples, the localizer system 430 generates vehicle poses periodically (e.g., every second, every half second). The localizer system 430 appends time stamps to vehicle poses, where the time stamp for a pose indicates the point in time that is described by the pose. The localizer system 430 generates vehicle poses by comparing sensor data (e.g., remote sensor data) to map data 426 describing the surrounding environment of the vehicle 400.

In some examples, the localizer system 430 includes one or more pose estimators and a pose filter. Pose estimators generate pose estimates by comparing remote-sensor data (e.g., LIDAR, RADAR) to map data. The pose filter receives pose estimates from the one or more pose estimators as well as other sensor data such as, for example, motion sensor data from an IMU, encoder, or odometer. In some examples, the pose filter executes a Kalman filter or machine learning algorithm to combine pose estimates from the one or more pose estimators with motion sensor data to generate vehicle poses. In some examples, pose estimators generate pose estimates at a frequency less than the frequency at which the localizer system 430 generates vehicle poses. Accordingly, the pose filter generates some vehicle poses by extrapolating from a previous pose estimate utilizing motion sensor data.

Vehicle poses and/or vehicle positions generated by the localizer system 430 are provided to various other components of the vehicle autonomy system 402. For example, the commander system 411 may utilize a vehicle position to determine whether to respond to a call from a dispatch system 440.

The commander system 411 determines a set of one or more target locations that are used for routing the vehicle 400. The target locations are determined based on user input received via a user interface 409 of the vehicle 400. The user interface 409 may include and/or use any suitable input/output device or devices. In some examples, the commander system 411 determines the one or more target locations considering data received from the dispatch system 440. The dispatch system 440 is programmed to provide instructions to multiple vehicles, for example, as part of a fleet of vehicles for moving passengers and/or cargo. Data from the dispatch system 440 can be provided via a wireless network, for example.

The navigator system 413 receives one or more target locations from the commander system 411 and map data 426. Map data 426, for example, provides detailed information about the surrounding environment of the vehicle 400. Map data 426 provides information regarding identity and location of different roadways and segments of roadways (e.g., lane segments or route components). A roadway is a place where the vehicle 400 can drive and may include, for example, a road, a street, a highway, a lane, a parking lot, or a driveway. Routing graph data is a type of map data 426.

From the one or more target locations and the map data 426, the navigator system 413 generates route data describing a route for the vehicle to take to arrive at the one or more target locations. In some implementations, the navigator system 413 determines route data using one or more path planning algorithms based on costs for route components, as described herein. For example, a cost for a route can indicate a time of travel, risk of danger, or other or other factor associated with adhering to a particular candidate route. For example, the reward can be of a sign opposite to that of cost. Route data describing a route is provided to the motion planning system 405, which commands the vehicle controls 407 to implement the route or route extension, as described herein. The navigator system 413 can generate routes as described herein using a general purpose routing graph and constraint data. Also, in examples where route data is received from a dispatch system, that route data can also be provided to the motion planning system 405.

The perception system 403 detects objects in the surrounding environment of the vehicle 400 based on sensor data, map data 426, and/or vehicle poses provided by the localizer system 430. For example, map data 426 used by the perception system describes roadways and segments thereof and may also describe: buildings or other items or objects (e.g., lampposts, crosswalks, curbing); location and directions of traffic lanes or lane segments (e.g., the location and direction of a parking lane, a turning lane, a bicycle lane, or other lanes within a particular roadway); traffic control data (e.g., the location and instructions of signage, traffic lights, or other traffic control devices); and/or any other map data that provides information that assists the vehicle autonomy system 402 in comprehending and perceiving its surrounding environment and its relationship thereto.

In some examples, the perception system 403 determines state data for one or more of the objects in the surrounding environment of the vehicle 400. State data describes a current state of an object (also referred to as features of the object). The state data for each object describes, for example, an estimate of the object's: current location (also referred to as position); current speed (also referred to as velocity); current acceleration; current heading; current orientation; size/shape/footprint (e.g., as represented by a bounding shape such as a bounding polygon or polyhedron); type/class (e.g., vehicle versus pedestrian versus bicycle versus other); yaw rate; distance from the vehicle 400; minimum path to interaction with the vehicle 400; minimum time duration to interaction with the vehicle 400; and/or other state information.

In some implementations, the perception system 403 determines state data for each object over a number of iterations. In particular, the perception system 403 updates the state data for each object at each iteration. Thus, the perception system 403 detects and tracks objects, such as other vehicles, that are proximate to the vehicle 400 over time.

The prediction system 404 is configured to predict one or more future positions for an object or objects in the environment surrounding the vehicle 400 (e.g., an object or objects detected by the perception system 403). The prediction system 404 generates prediction data associated with one or more of the objects detected by the perception system 403. In some examples, the prediction system 404 generates prediction data describing each of the respective objects detected by the prediction system 404.

Prediction data for an object is indicative of one or more predicted future locations of the object. For example, the prediction system 404 may predict where the object will be located within the next 5 seconds, 20 seconds, 200 seconds, etc. Prediction data for an object may indicate a predicted trajectory (e.g., predicted path) for the object within the surrounding environment of the vehicle 400. For example, the predicted trajectory (e.g., path) can indicate a path along which the respective object is predicted to travel over time (and/or the speed at which the object is predicted to travel along the predicted path). The prediction system 404 generates prediction data for an object, for example, based on state data generated by the perception system 403. In some examples, the prediction system 404 also considers one or more vehicle poses generated by the localizer system 430 and/or map data 426.

In some examples, the prediction system 404 uses state data indicative of an object type or classification to predict a trajectory for the object. As an example, the prediction system 404 can use state data provided by the perception system 403 to determine that a particular object (e.g., an object classified as a vehicle) approaching an intersection and maneuvering into a left-turn lane intends to turn left. In such a situation, the prediction system 404 predicts a trajectory (e.g., path) corresponding to a left-turn for the vehicle 400 such that the vehicle 400 turns left at the intersection. Similarly, the prediction system 404 determines predicted trajectories for other objects, such as bicycles, pedestrians, parked vehicles, etc. The prediction system 404 provides the predicted trajectories associated with the object(s) to the motion planning system 405.

In some implementations, the prediction system 404 is a goal-oriented prediction system 404 that generates one or more potential goals, selects one or more of the most likely potential goals, and develops one or more trajectories by which the object can achieve the one or more selected goals. For example, the prediction system 404 can include a scenario generation system that generates and/or scores the one or more goals for an object, and a scenario development system that determines the one or more trajectories by which the object can achieve the goals. In some implementations, the prediction system 404 can include a machine-learned goal-scoring model, a machine-learned trajectory development model, and/or other machine-learned models.

The motion planning system 405 commands the vehicle controls based at least in part on the predicted trajectories associated with the objects within the surrounding environment of the vehicle 400, the state data for the objects provided by the perception system 403, vehicle poses provided by the localizer system 430, map data 426, and route or route extension data provided by the navigator system 413. Stated differently, given information about the current locations of objects and/or predicted trajectories of objects within the surrounding environment of the vehicle 400, the motion planning system 405 determines control commands for the vehicle 400 that best navigate the vehicle 400 along the route or route extension relative to the objects at such locations and their predicted trajectories on acceptable roadways.

In some implementations, the motion planning system 405 can also evaluate one or more cost functions and/or one or more reward functions for each of one or more candidate control commands or sets of control commands for the vehicle 400. Thus, given information about the current locations and/or predicted future locations/trajectories of objects, the motion planning system 405 can determine a total cost (e.g., a sum of the cost(s) and/or reward(s) provided by the cost function(s) and/or reward function(s)) of adhering to a particular candidate control command or set of control commands. The motion planning system 405 can select or determine a control command or set of control commands for the vehicle 400 based at least in part on the cost function(s) and the reward function(s). For example, the motion plan that minimizes the total cost can be selected or otherwise determined.

In some implementations, the motion planning system 405 can be configured to iteratively update the route or route extension for the vehicle 400 as new sensor data is obtained from one or more sensors 401. For example, as new sensor data is obtained from one or more sensors 401, the sensor data can be analyzed by the perception system 403, the prediction system 404, and the motion planning system 405 to determine the motion plan.

The motion planning system 405 can provide control commands to one or more vehicle controls 407. For example, the one or more vehicle controls 407 can include throttle systems, brake systems, steering systems, and other control systems, each of which can include various vehicle controls (e.g., actuators or other devices that control gas flow, steering, braking) to control the motion of the vehicle 400. The various vehicle controls 407 can include one or more controllers, control devices, motors, and/or processors.

The vehicle controls 407 includes a brake control module 420. The brake control module 420 is configured to receive a braking command and bring about a response by applying (or not applying) the vehicle brakes. In some examples, the brake control module 420 includes a primary system and a secondary system. The primary system receives braking commands and, in response, brakes the vehicle 400. The secondary system is configured to determine a failure of the primary system to brake the vehicle 400 in response to receiving the braking command.

A steering control system 432 is configured to receive a steering command and bring about a response in the steering mechanism of the vehicle 400. The steering command is provided to a steering system to provide a steering input to steer the vehicle 400.

A lighting/auxiliary control module 436 receives a lighting or auxiliary command. In response, the lighting/auxiliary control module 436 controls a lighting and/or auxiliary system of the vehicle 400. Controlling a lighting system may include, for example, turning on, turning off, or otherwise modulating headlines, parking lights, running lights, etc. Controlling an auxiliary system may include, for example, modulating windshield wipers, a defroster, etc.

A throttle control system 434 is configured to receive a throttle command and bring about a response in the engine speed or other throttle mechanism of the vehicle. For example, the throttle control system 434 can instruct an engine and/or engine controller, or other propulsion system component to control the engine or other propulsion system of the vehicle 400 to accelerate, decelerate, or remain at its current speed.

Each of the perception system 403, the prediction system 404, the motion planning system 405, the commander system 411, the navigator system 413, and the localizer system 430, can be included in or otherwise be a part of a vehicle autonomy system 402 configured to control the vehicle 400 based at least in part on data obtained from one or more sensors 401. For example, data obtained by one or more sensors 401 can be analyzed by each of the perception system 403, the prediction system 404, and the motion planning system 405 in a consecutive fashion in order to control the vehicle 400. While FIG. 4 depicts elements suitable for use in a vehicle autonomy system according to example aspects of the present disclosure, one of ordinary skill in the art will recognize that other vehicle autonomy systems can be configured to control an autonomous vehicle based on sensor data.

The vehicle autonomy system 402 includes one or more computing devices, which may implement all or parts of the perception system 403, the prediction system 404, the motion planning system 405 and/or the localizer system 430. Descriptions of hardware and software configurations for computing devices to implement the vehicle autonomy system 402 and/or the vehicle autonomy system 104 are provided herein at FIGS. 11 and 12.

Figure 5:
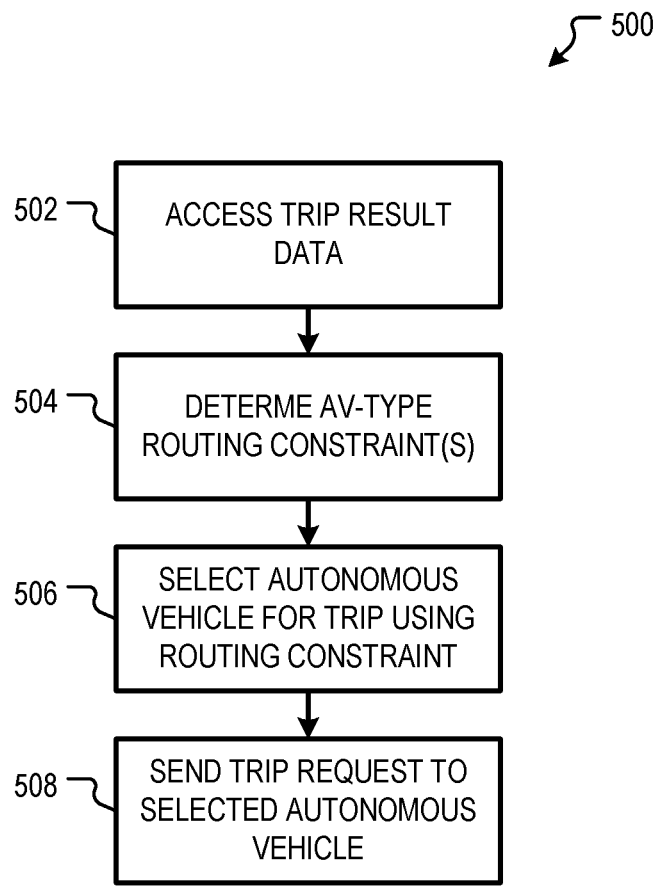
FIG. 5 is a flowchart showing one example of a process flow that can be executed by the dispatch system of FIG. 1 to tune trip dispatching based on vehicle movement data.

FIG. 5 is a flowchart showing one example of a process flow 500 that can be executed by the dispatch system 104 to tune trip dispatching based on vehicle movement data. At operation 502, the dispatch system 104 accesses vehicle movement data. The vehicle movement data describes or indicates a plurality of trips executed by autonomous vehicles. In some examples, the vehicle movement data describes trips executed by autonomous vehicles of different types. In other examples, the trip result describes trips executed by autonomous vehicles of a single type. The vehicle movement data can include various data about the trips such as, for example, indications and/or descriptions of any events that occurred on the trip and metadata describing the events. In some examples, vehicle movement data also includes other data regarding the trips such as, for example, a planned route for the trip, an actual route for the trip, localization data describing poses of the vehicle during the trip, etc.

At operation 504, the dispatch system 104 determines at least one routing constraint for a first type of autonomous vehicle. This can be performed, for example, as described herein. The dispatch system 104 can associate events described by the vehicle movement data 122 for the first type of autonomous vehicle with one or more route components from the routing graph 124. Upon identifying one or more route components associated with an event, the dispatch system 104 identifies one or more route component properties that may have contributed to the event. The dispatch system 104 generates one or more constraints that apply a graph modification to route components at the routing graph 124 that have the same route component properties (e.g., unprotected left turn, speed limit about 35 m.p.h., etc.). In some examples where the vehicle movement data 122 describes multiple types of autonomous vehicles, the dispatch system 104 generates routing constraints for multiple different types of autonomous vehicles at operation 504.

At operation 506, the dispatch system 104 selects an autonomous vehicle 102 for a trip using the routing constraint generated at operation 504. This can include, for example, generating candidate routes including a candidate route for at least one autonomous vehicle of the first type. In some embodiments, the candidate route for the autonomous vehicle of the first type is generated with a constrained routing graph 109 generated by applying the routing constraint or constraints generated at operation 504. The dispatch system 104 can select an autonomous vehicle based on costs of the candidate. At operation 508, the dispatch system 104 sends a trip request to the selected autonomous vehicle, which begins to manipulate vehicle controls to execute the route.

Figure 6:
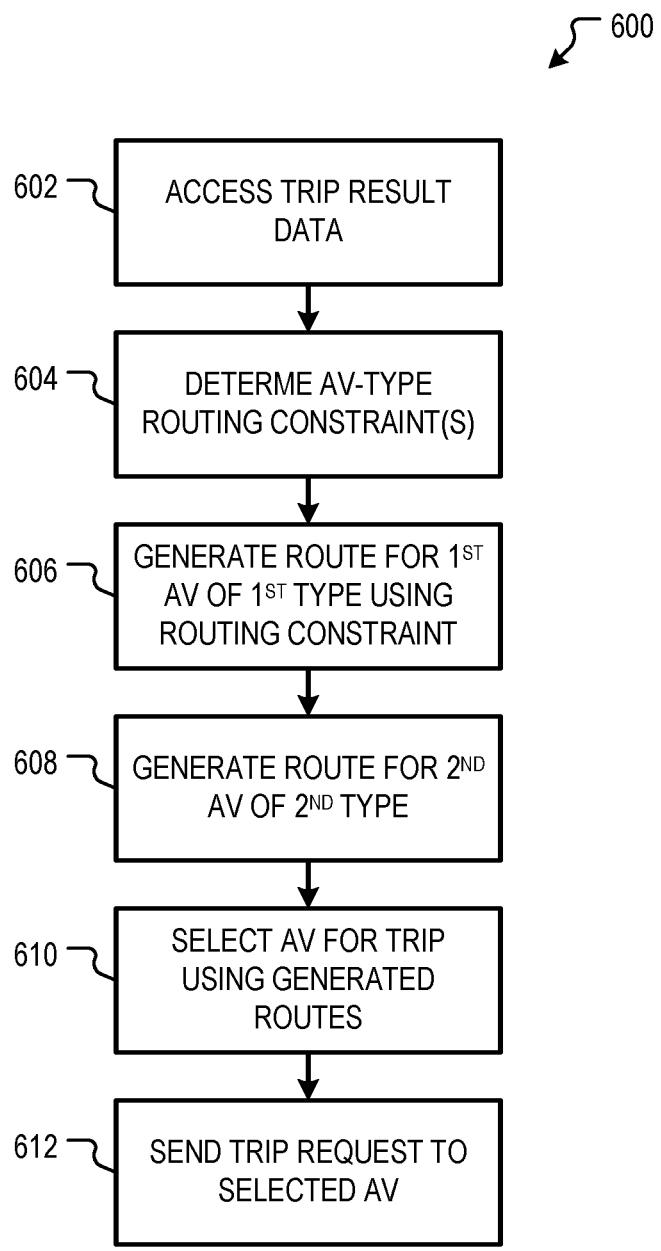
FIG. 6 is a flowchart showing another example of a process flow that can be executed by the dispatch system of FIG. 1 to tune trip dispatching based on vehicle movement data.

FIG. 6 is a flowchart showing another example of a process flow 600 that can be executed by the dispatch system 104 to tune trip dispatching based on vehicle movement data. At operation 602, the dispatch system 104 accesses vehicle movement data. The vehicle movement data describes a plurality of trips executed by autonomous vehicles. In this example, the vehicle movement data describes, at least, trips executed by autonomous vehicles of a first type and trips executed by autonomous vehicles of a second type.

At operation 604, the dispatch system 104 determines at least one routing constraint for the first type of autonomous vehicle and at least one routing constraint for the second type of autonomous vehicle. This can be performed, for example, as described herein. At operation 606, the dispatch system 104 generates a candidate route for an autonomous vehicle of the first type using at least one routing constraint generated at operation 604. The candidate route can execute a first trip. At operation 608, the dispatch system 104 generates a candidate route for an autonomous vehicle of the second type to execute the first trip, also using at least one routing constraint generated at operation 604.

At operation 610, the dispatch system 104 selects the first autonomous vehicle or the second autonomous vehicle to execute the first trip using the candidate routes generated at operations 608, 610. The dispatch system 104 can select the vehicle with the lowest cost candidate route and/or can consider other factors, as described herein. At operation 612, the dispatch system 104 sends a trip request to the selected autonomous vehicle, which begins to manipulate vehicle controls to execute the route.

an autonomous vehicle based on costs of the candidate. At operation 608, the dispatch system 104 sends a trip request to the selected autonomous vehicle.

Figure 7:
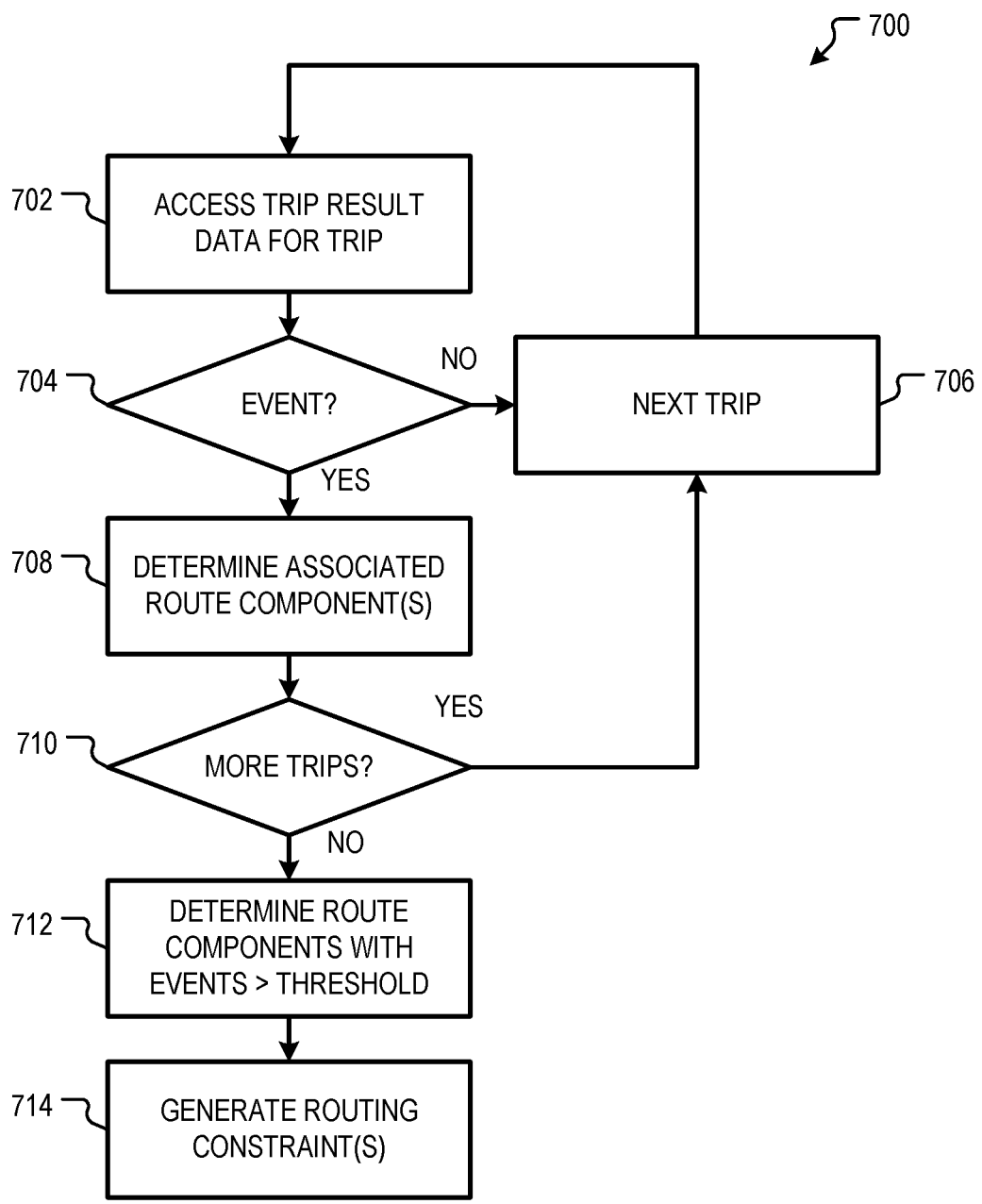
FIG. 7 is a flowchart showing one example of a process flow that can be executed by the dispatch system of FIG. 1 to determine routing constraints for autonomous vehicles of a particular type using vehicle movement data.

FIG. 7 is a flowchart showing one example of a process flow 700 that can be executed by the dispatch system 104 to determine routing constraints for autonomous vehicles of a first type using vehicle movement data. At operation 702, the dispatch system 104 accesses vehicle movement data for a first trip. At operation 704, the dispatch system 104 determines if there are any events associated with the first trip. In some examples, this includes determining whether there are any adverse events associated with the trip. If there are no events (e.g., no adverse events) associated with the trip, the dispatch system proceeds to the next trip at operation 706 and accesses vehicle movement data for the next trip at operation 702.

If there is an event associated with the trip, the dispatch system 104 determines one or more route components associated with the event or events associated with the trip at operation 708. This can be performed, for example, as described herein. At operation 710, the dispatch system 104 determines route components from the routing graph 124 that have greater than a threshold number or rate of events. At operation 714, the dispatch system 104 generates routing constraints for the first vehicle type, for example, based on the route components identified at operation 712.

Figure 8:
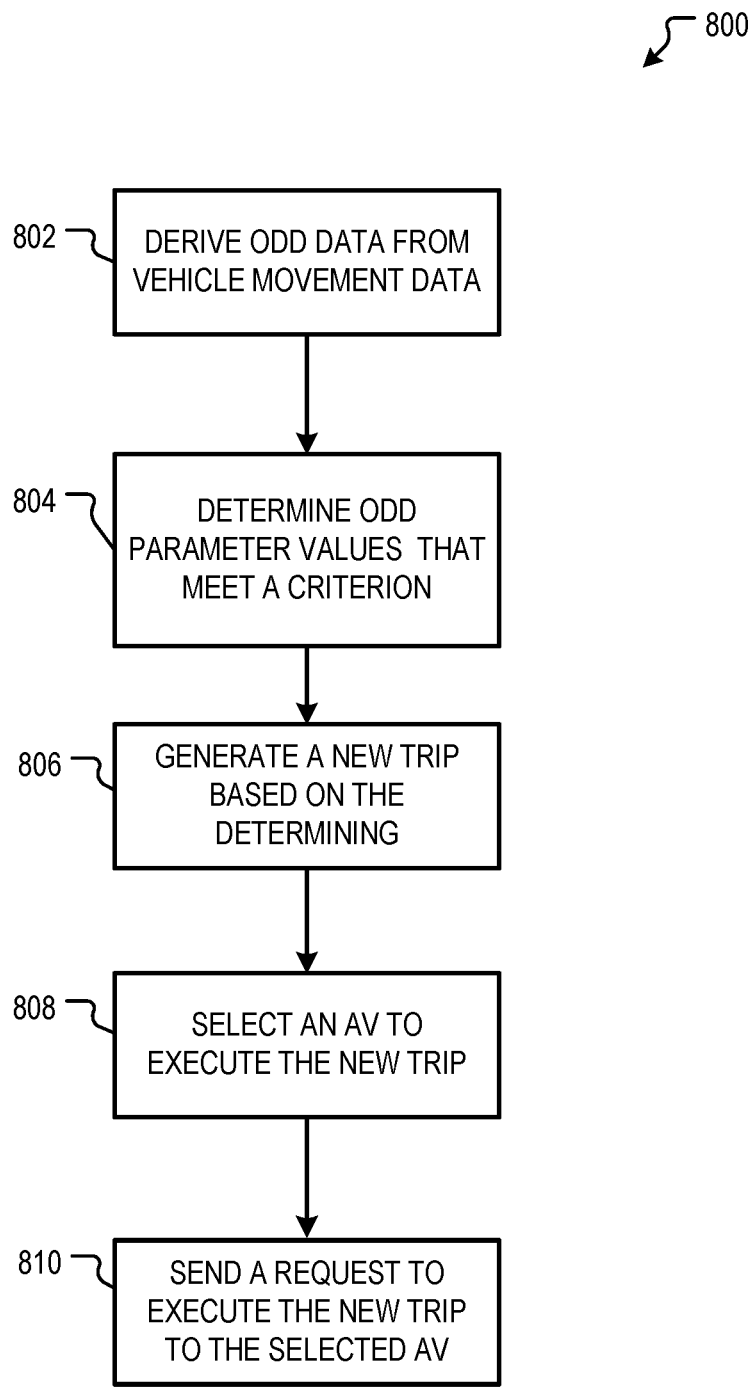
FIG. 8 is a flowchart showing one example of a process flow for deriving ODD parameters of an AV type.

FIG. 8 is a flowchart of a method for generating a trip request. In some aspects, one or more of the functions discussed below with respect to FIG. 8 is performed by hardware processing circuitry. For example, an electronic memory may store instructions that when executed, configure the hardware processing circuitry to perform one or more of the functions discussed below.

In operation 802, operational design domain (ODD) data is derived from vehicle movement data. In some aspects, the vehicle movement data may include data indicating movement of a vehicle that was not necessarily included in a trip. For example, the vehicle movement data may include a series of GPS coordinates that indicate a route taken by a vehicle when moving from a destination location of a first trip to an origin location of a second trip.

In some aspects, the vehicle movement data includes trip result data. In some aspects, the trip result data may include one or more of the data discussed above with respect to the trip table 350 and trip segment table 360. In some aspects, the trip result data is analyzed with respect to a particular AV type to derive ODD data for the particular AV type. For example, the trip result data is analyzed to detect patterns in how a particular AV type performs with respect to previous trips. Performance may include result data indicating whether a particular AV type accepts particular trips, and/or which particular routes and speeds the particular AV type uses when executing a trip. As discussed above with respect to FIG. 3, one or more ODD parameters may be identified with each map segment (e.g. via field 319). When an AV type rejects a route including a particular map segment, or an AV deviates around a particular map segment, some embodiments may use such an occurrence to indicate the AV does not have capabilities associated with those map segments. Those capabilities may be identified, in some embodiments, via the ODD parameter list field 319 that is associated with each map segment, at least in some embodiments.

As discussed above with respect to FIG. 3, in some aspects, at least some ODD parameters for an autonomous vehicle are associated with a threshold number of positive demonstrations of a capability associated with the ODD parameter (e.g. 374) and/or a threshold number of negative indications of the capability associated with the ODD parameter (e.g. 376). As one example, before the disclosed embodiments conclude or derive that a particular AV type can navigate traffic circles, a threshold number of trips that include the navigation of traffic circles may need to be completed. Thus, operation 802 may analyze trip result data for a particular AV, and evaluate whether each of the trip result data demonstrates each of a plurality of capabilities associated with a corresponding plurality of ODD parameters for the AV. The ODD parameters for the particular AV type are then set as appropriate based on the analysis of the trip result data to reflect demonstrated capabilities of the AV type. For example, if the trip result data demonstrates a threshold number of positive occurrences of a capability, an ODD parameter indicating that capability is set to indicate the AV type includes the capability. Similarly, if the trip result data demonstrates a threshold number of negative occurrences of the capability (e.g. declining a route including a need to demonstrate the capability, avoiding a portion of a route assigned to the vehicle that would require demonstration of the capability), then the ODD parameter indicating that capability is set to indicate the AV type does not include that capability.

In operation 804, a determination is made that the ODD data includes at least one ODD parameter that meets a criterion. In some aspects, the criterion identifies ODD parameters for a particular vehicle type that have insufficient vehicle movement data necessary to conclude whether the vehicle type has a particular capability or not. In other words, the trip result data may have been insufficient to accurately determine one or more ODD parameter values for a particular AV type. For example, in some embodiments, operation 804 may determine whether the trip result data meets one or more of the threshold positive value 374 and/or threshold negative value 376 for one or more ODD parameter values 372. In some embodiments, if the number of trip result data records for a particular AV type is below each of the thresholds 374 and/or 376, the trip result data does not include sufficient data to accurately set one or more of the ODD parameter values, at least in these embodiments.

In operation 806, a new trip is generated based on the missing parameter. For example, if operation 804 determines that the trip result data includes fewer than a threshold negative or threshold positive number of trip results demonstrating a particular capability, a new trip is generated that will obtain additional information on the ODD parameter. For example, if the ODD parameter indicates whether the AV type is capable of turning left at an unprotected intersection, a trip is generated that requires turning left at an unprotected intersection to complete. In some aspects, the new trip is generated to include route segments requiring demonstration of a capability associated with the ODD parameter (e.g. via field 318). The new trip may or may not be generated based on a passenger-based trip request. In some aspects, the new trip may be generated so that the vehicle does not carry passengers, but is tasked to traverse a particular route for the purpose of collecting additional vehicle movement data such that ODD information for the vehicle type may be more complete.

In operation 808, an AV of the particular type is selected to execute the new trip.

In operation 810, a request to execute the new trip is sent to the selected AV.

In some aspects of process 800, the ODD parameter is set based on a response to the request. For example, if the AV of the particular type rejects a trip that requires an unprotected left turn, this may be indicative that the AV is unable to perform this capability. Thus, in some embodiments, an ODD parameter indicating the AV type's ability to perform unprotected left terms is set based on whether the request was accepted or rejected. In some aspects, process 800 may include monitoring a route taken by the AV when performing the trip. For example, while the trip may initially include an unprotected left turn, the AV may deviate from the planned route to avoid the unprotected left turn. This deviation may cause the ODD parameter to be set indicating that the AV type does not support unprotected left turns.

Alternatively, thresholding of trip result data is used to control setting of ODD parameters. For example, a single example of an AV type deviating to avoid an unprotected left turn is insufficient in some embodiments for the disclosed embodiments to conclude that the AV type does not support unprotected left turns, and thus, no ODD parameter updates are made based on this single example. In some embodiments, if a number of trip deviations to avoid an unprotected left turn exceeds a threshold (e.g. threshold 376), then enough data is present to set the ODD parameter indicating that the AV type does not support this capability.

Figure 9:
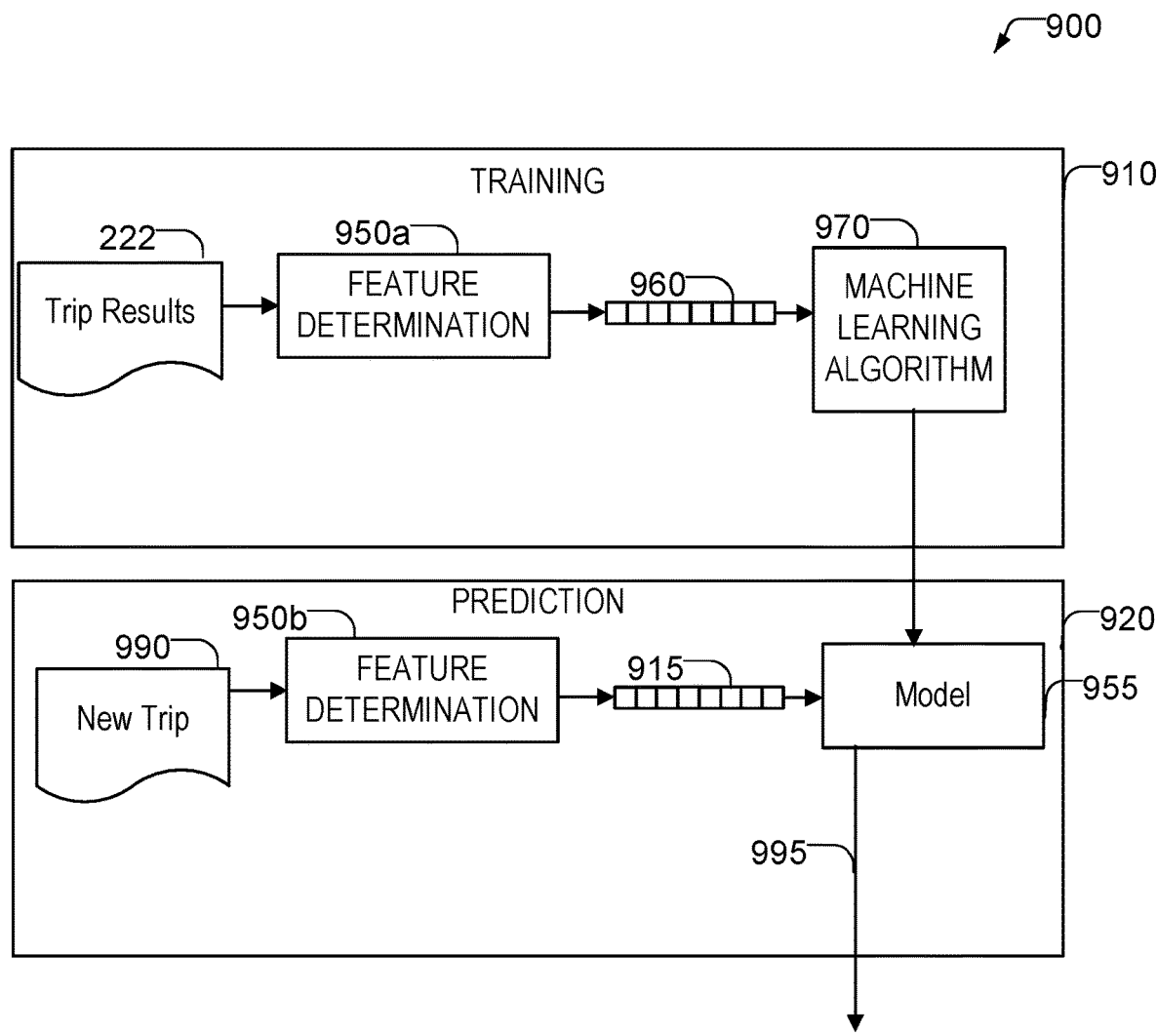
FIG. 9 shows an example machine learning module 900 according to some examples of the present disclosure.

FIG. 9 shows an example machine learning module 900 according to some examples of the present disclosure. The machine learning module 900 may operate, in some aspects, at least partially within the routing engine 110 discussed above with respect to FIG. 1. Machine learning module 900 utilizes a training module 910 and a prediction module 920. Training module 910 inputs vehicle movement data 222 into feature determination module 950a. The vehicle movement data 222 may include result labels (e.g. 359, fields of 360). Example trip results or labels may include indications of whether a trip from a particular origin to a particular destination was accepted or rejected, how an AV of a particular type performed during the trip, and what map segments an AV used to execute the trip (e.g. indicated via one or more fields of table 360).

Feature determination module 950a determines one or more features 960 from the vehicle movement data 222. Stated generally, features 960 are a set of the information input and determined to be predictive of a particular outcome. In some examples, the features 960 include all of the trip result data, but in other examples, the features 960 are a subset of the trip result data. The machine learning algorithm 970 produces a model 955 based upon the features 960 and the label.

In the prediction module 920, a new trip 990 is input to the feature determination module 950. Feature determination module 950b may determine the same set of features or a different set of features from the new trip 990 as feature determination module 950a determined from vehicle movement data 222. In some examples, feature determination module 950a and 950b are the same module. Feature determination module 950b produces feature vector 915, which is input into the model 955 to generate an output 995 may include a recommendation for an AV type to which the new trip 990 is dispatched. In other words, the model 955 may learn, based on the vehicle movement data 222, which AV types have capabilities compatible with the new trip 990 and/or will perform the new trip 990 most efficiently and/or effectively. The output 995 may further comprise, in some aspects, recommendations for one or more additional trips that can augment the vehicle movement data 222 and provide for improved training via the training model 910. The training module 910 may operate in an offline manner to train the model 955. The prediction module 920, however, is designed to operate in an online manner in at least some embodiments. It should be noted that the model 955 is periodically updated via additional training and/or user feedback.

The machine learning algorithm 970 is selected from among many different potential supervised or unsupervised machine learning algorithms. Examples of supervised learning algorithms include artificial neural networks, Bayesian networks, instance-based learning, support vector machines, decision trees (e.g., Iterative Dichotomiser 3, C4.5, Classification and Regression Tree (CART), Chi-squared Automatic Interaction Detector (CHAID), and the like), random forests, linear classifiers, quadratic classifiers, k-nearest neighbor, linear regression, logistic regression, hidden Markov models, models based on artificial life, simulated annealing, and/or virology. Examples of unsupervised learning algorithms include expectation-maximization algorithms, vector quantization, and information bottleneck method. Unsupervised models may not have a training module 910. In an example embodiment, a regression model is used and the model 955 is a vector of coefficients corresponding to a learned importance for each of the features in the vector of features 960, and/or 915. To calculate a score, a dot product of the feature vector 915 and the vector of coefficients of the model 955 is taken.

Figure 10:
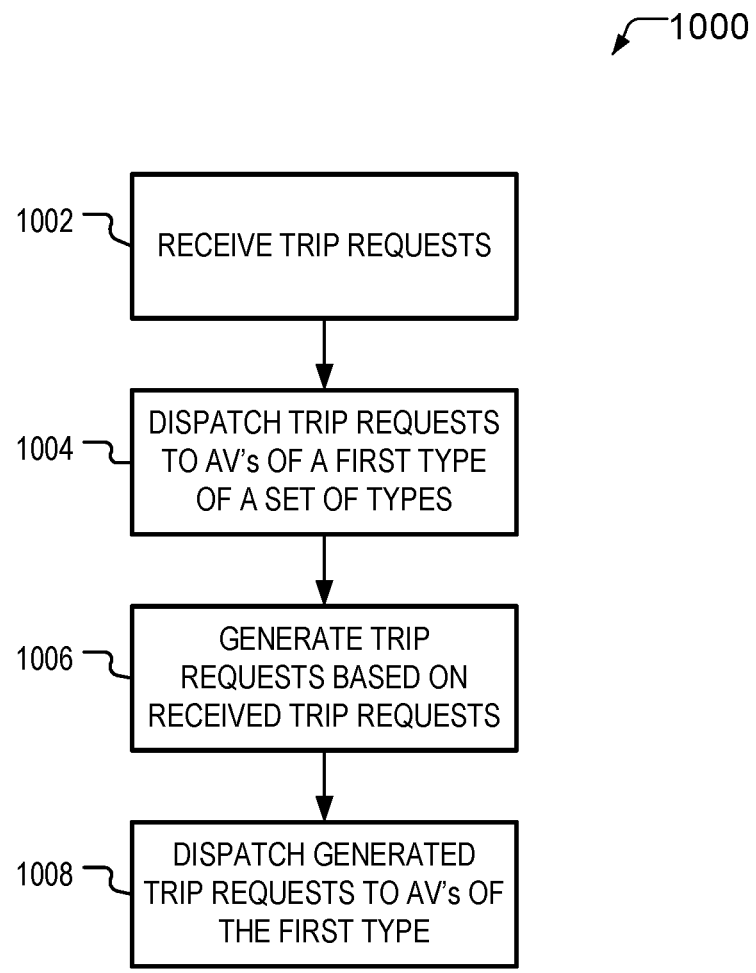
FIG. 10 is a flowchart for a method to obscure demand information when dispatching autonomous vehicles.

FIG. 10 is a flowchart for a method to obscure demand information when dispatching autonomous vehicles. In some aspects, one or more of the functions discussed below with respect to FIG. 10 is performed by hardware processing circuitry. For example, in some embodiments, an electronic memory (e.g. 1204 and/or 1206, discussed below) stores instructions (e.g. 1224 discussed below) that when executed configure hardware processing circuitry (e.g. 1202 discussed below) to perform one or more of the functions discussed below with respect to FIG. 10.

In operation 1002, trip requests are received. For example, trip requests from a plurality of source locations to a plurality of corresponding destination locations are received. The trip requests received in operation 1002 are generated by paying customers. In other words, each trip request of operation 1002 represents a real human requesting to participate in a real ride from a real source to a real destination. In addition, each trip request received in operation 1002 corresponds, or is generated via, an active account.

In operation 1004, the trip requests are dispatched to autonomous vehicles. The autonomous vehicles are of a particular type. For example, the autonomous vehicles are manufactured by a particular manufacturer, or have a particular version of autonomous control software developed by a particular vendor. Note that by receiving dispatches of the trip requests, a particular manufacturer of the particular type of autonomous vehicle obtains knowledge of a demand level of trip requests. This represents competitive information that is disadvantageous to share with the particular manufacturer. While in some aspects, partnerships are formed between an entity dispatching trip requests and a second entity executing the trips, the relationship may also include competitive elements, and thus, it may be desirable to obscure demand data from the second entity, while still utilizing the second entity to execute trips.

In operation 1006, one or more trip requests are generated. In contrast to the trip requests received in operation 1002 from paying customers, the trip requests generated in operation 1006 are generated without an explicit request from a paying customer or an active account. In some aspects, the trip requests generated in operation 1006 are generated, at least in part, randomly. For example, an origin location and/or destination location for the generated trip requests are generated based on a random number in some embodiments. A time to generate the trip requests also includes a random component in some embodiments. In some embodiments, the requests generated in operation 1006 are generated based on the dispatched trip requests of operation 1004. For example, if the dispatched trip requests of operation 1004 represent a pattern of activity, operation 1006 generates, in some embodiments, additional trip requests to obscure or eliminate the pattern. As one example, if the dispatched trip requests 1004 demonstrate a first number of trip requests on weekends and a second number of trip requests on week days, the trip requests generated in operation 1006 are generated in some embodiments to equalize the number of requests on each day of the week, such that no demand differential is evidenced on weekends versus week days. Similarly, hourly demand differentials are equalized by the generated trip requests of operation 1006 in some embodiments. In some embodiments, equalization of origin location and/or destination locations are established via the generated trip requests. In some aspects, pairs of origin locations and destination locations (or regions within a proximity of particular origin locations and destination locations) are equalized, or at least made less different, via the generated trip requests.

In some aspects, demand levels indicated by the trip requests of operation 1002 that are below a first threshold is augmented by trip requests generated in operation 1006 to be above the first threshold or a second (higher) threshold of demand. In some aspects, the demand levels represented by the trip requests of operation 1002 is determined on a per region basis. Each region may have its own first and/or second thresholds in some embodiments. A region is a bounded geographic region. For example, some aspects may define regions by zip codes or congressional districts. Other methods of defining regions are contemplated. Demographic data and/or population density may define regions, with highly populated regions forming a first set of regions and lower density areas forming a second set of regions.

In operation 1008, the trip requests generated in operation 1006 are dispatched. In some embodiments, the trip requests generated in operation 1006 are dispatched to AVs of the first type. Note that in some embodiments, process 1000 is repeated for each of several types of AVs, to obscure demand to each of the vendors corresponding to each of the AV types.

Figure 11:
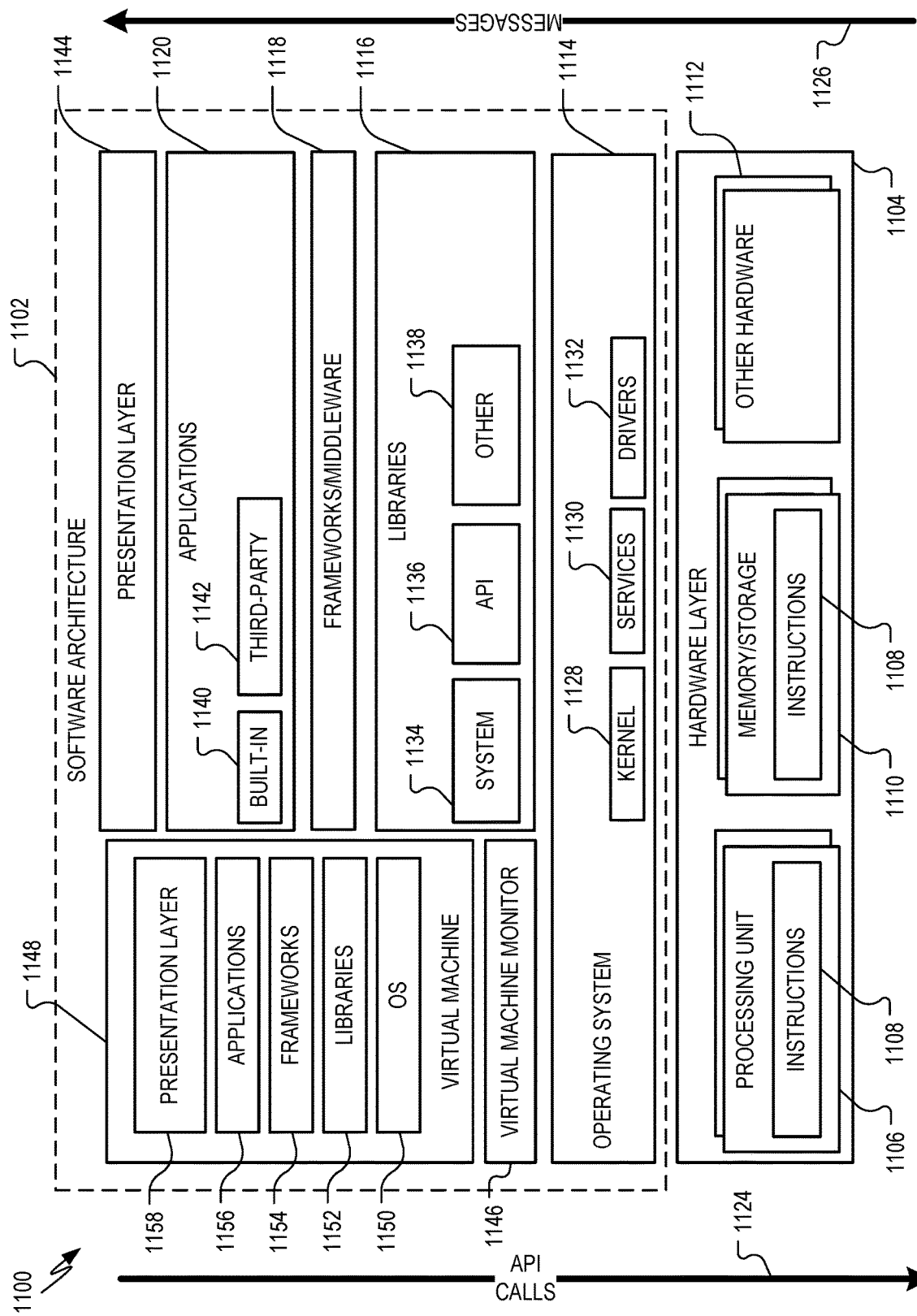
FIG. 11 is a block diagram showing one example of a software architecture for a computing device.

FIG. 11 is a block diagram 1100 showing one example of a software architecture 1102 for a computing device. In some embodiments, the software architecture 1102 is used in conjunction with various hardware architectures, for example, as described herein. FIG. 11 is merely a non-limiting example of a software architecture 1102 and many other architectures may be implemented to facilitate the functionality described herein. A representative hardware layer 1104 is illustrated and can represent, for example, any of the above-referenced computing devices. In some examples, the hardware layer 1104 may be implemented according to an architecture 1200 of FIG. 12 and/or the software architecture 1102 of FIG. 11.

The representative hardware layer 1104 comprises one or more processing units 1106 having associated executable instructions 1108. The executable instructions 1108 represent the executable instructions of the software architecture 1102, including implementation of the methods, modules, components, and so forth of FIGS. 1-10. The hardware layer 1104 also includes memory and/or storage modules 1110, which also have the executable instructions 1108. The hardware layer 1104 may also comprise other hardware 1112, which represents any other hardware of the hardware layer 1104, such as the other hardware illustrated as part of the architecture 1200.

In the example architecture of FIG. 11, the software architecture 1102 may be conceptualized as a stack of layers where each layer provides particular functionality. For example, the software architecture 1102 may include layers such as an operating system 1114, libraries 1116, frameworks/middleware 1118, applications 1120, and a presentation layer 1144. Operationally, the applications 1120 and/or other components within the layers may invoke API calls 1124 through the software stack and receive a response, returned values, and so forth illustrated as messages 1126 in response to the API calls 1124. The layers illustrated are representative in nature and not all software architectures have all layers. For example, some mobile or special-purpose operating systems may not provide a frameworks/middleware 1118 layer, while others may provide such a layer. Other software architectures may include additional or different layers.

The operating system 1114 may manage hardware resources and provide common services. The operating system 1114 may include, for example, a kernel 1128, services 1130, and drivers 1132. The kernel 1128 may act as an abstraction layer between the hardware and the other software layers. For example, the kernel 1128 may be responsible for memory management, processor management (e.g., scheduling), component management, networking, security settings, and so on. The services 1130 may provide other common services for the other software layers. In some examples, the services 1130 include an interrupt service. The interrupt service may detect the receipt of a hardware or software interrupt and, in response, cause the software architecture 1102 to pause its current processing and execute an ISR when an interrupt is received. The ISR may generate an alert.

The drivers 1132 may be responsible for controlling or interfacing with the underlying hardware. For instance, the drivers 1132 may include display drivers, camera drivers, Bluetooth® drivers, flash memory drivers, serial communication drivers (e.g., Universal Serial Bus (USB) drivers), Wi-Fi®drivers, NFC drivers, audio drivers, power management drivers, and so forth depending on the hardware configuration.

The libraries 1116 may provide a common infrastructure that may be used by the applications 1120 and/or other components and/or layers. The libraries 1116 typically provide functionality that allows other software modules to perform tasks in an easier fashion than by interfacing directly with the underlying operating system 1114 functionality (e.g., kernel 1128, services 1130, and/or drivers 1132). The libraries 1116 may include system libraries 1134 (e.g., C standard library) that may provide functions such as memory allocation functions, string manipulation functions, mathematic functions, and the like. In addition, the libraries 1116 may include API libraries 1136 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1116 may also include a wide variety of other libraries 1138 to provide many other APIs to the applications 1120 and other software components/modules.

The frameworks 1118 (also sometimes referred to as middleware) may provide a higher-level common infrastructure that may be used by the applications 1120 and/or other software components/modules. For example, the frameworks 1118 may provide various graphical user interface (GUI) functions, high-level resource management, high-level location services, and so forth. The frameworks 1118 may provide a broad spectrum of other APIs that may be used by the applications 1120 and/or other software components/modules, some of which may be specific to a particular operating system or platform.

The applications 1120 include built-in applications 1140 and/or third-party applications 1142. Examples of representative built-in applications 1140 may include, but are not limited to, a contacts application, a browser application, a book reader application, a location application, a media application, a messaging application, and/or a game application. The third-party applications 1142 may include any of the built-in applications 1140 as well as a broad assortment of other applications. In a specific example, the third-party application 1142 (e.g., an application developed using the Android™ or iOS™ software development kit (SDK) by an entity other than the vendor of the particular platform) may be mobile software running on a mobile operating system such as iOS™, Android™, Windows® Phone, or other computing device operating systems. In this example, the third-party application 1142 may invoke the API calls 1124 provided by the mobile operating system such as the operating system 1114 to facilitate functionality described herein.

The applications 1120 may use built-in operating system functions (e.g., kernel 1128, services 1130, and/or drivers 1132), libraries (e.g., system libraries 1134, API libraries 1136, and other libraries 1138), or frameworks/middleware 1118 to create user interfaces to interact with users of the system. Alternatively, or additionally, in some systems, interactions with a user may occur through a presentation layer, such as the presentation layer 1144. In these systems, the application/module "logic" can be separated from the aspects of the application/module that interact with a user.

Some software architectures use virtual machines. For example, systems described herein may be executed using one or more virtual machines executed at one or more server computing machines. In the example of FIG. 11, this is illustrated by a virtual machine 1148. A virtual machine creates a software environment where applications/modules can execute as if they were executing on a hardware computing device. The virtual machine 1148 is hosted by a host operating system (e.g., the operating system 1114) and typically, although not always, has a virtual machine monitor 1146, which manages the operation of the virtual machine 1148 as well as the interface with the host operating system (e.g., the operating system 1114). A software architecture executes within the virtual machine 1148, such as an operating system 1150, libraries 1152, frameworks/middleware 1154, applications 1156, and/or a presentation layer 1158. These layers of software architecture executing within the virtual machine 1148 can be the same as corresponding layers previously described or may be different.

Figure 12:
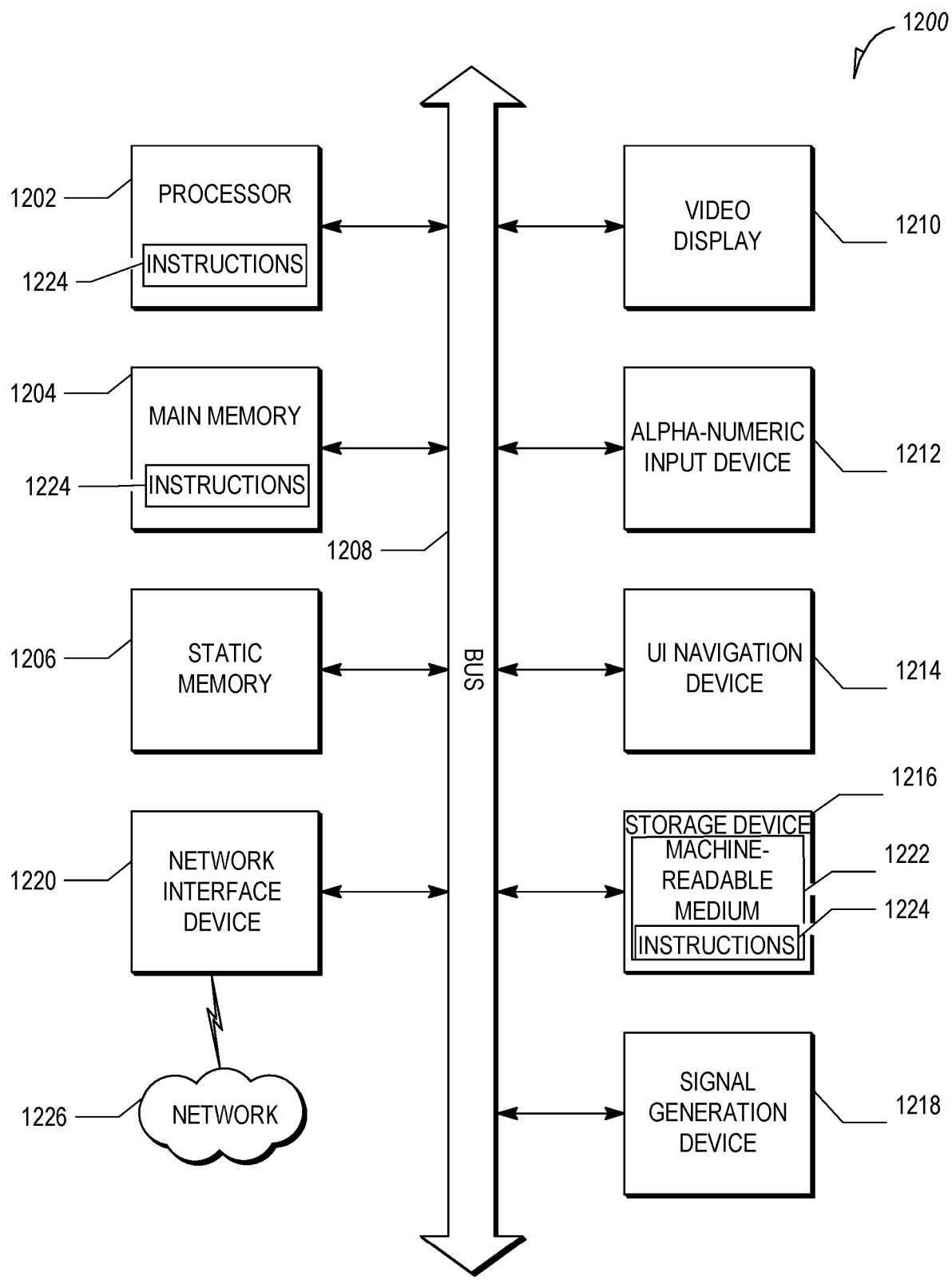
FIG. 12 is a block diagram illustrating a computing device hardware architecture.

FIG. 12 is a block diagram illustrating a computing device hardware architecture 1200, within which a set or sequence of instructions can be executed to cause a machine to perform examples of any one of the methodologies discussed herein. The hardware architecture 1200 describes a computing device for executing the vehicle autonomy system, described herein.

The architecture 1200 may operate as a standalone device or may be connected (e.g., networked) to other machines. In a networked deployment, the architecture 1200 may operate in the capacity of either a server or a client machine in server-client network environments, or it may act as a peer machine in peer-to-peer (or distributed) network environments. The architecture 1200 can be implemented in a personal computer (PC), a tablet PC, a hybrid tablet, a set-top box (STB), a personal digital assistant (PDA), a mobile telephone, a web appliance, a network router, a network switch, a network bridge, or any machine capable of executing instructions (sequential or otherwise) that specify operations to be taken by that machine.

The example architecture 1200 includes a processor unit 1202 comprising at least one processor (e.g., a central processing unit (CPU), a graphics processing unit (GPU), or both, processor cores, compute nodes). The architecture 1200 may further comprise a main memory 1204 and a static memory 1206, which communicate with each other via a link 1208 (e.g., bus). The architecture 1200 can further include a video display unit 1210, an input device 1212 (e.g., a keyboard), and a UI navigation device 1214 (e.g., a mouse). In some examples, the video display unit 1210, input device 1212, and UI navigation device 1214 are incorporated into a touchscreen display. The architecture 1200 may additionally include a storage device 1216 (e.g., a drive unit), a signal generation device 1218 (e.g., a speaker), a network interface device 1220, and one or more sensors (not shown), such as a Global Positioning System (GPS) sensor, compass, accelerometer, or other sensor.

In some examples, the processor unit 1202 or another suitable hardware component may support a hardware interrupt. In response to a hardware interrupt, the processor unit 1202 may pause its processing and execute an ISR, for example, as described herein.

The storage device 1216 includes a machine-readable medium 1222 on which is stored one or more sets of data structures and instructions 1224 (e.g., software) embodying or used by any one or more of the methodologies or functions described herein. The instructions 1224 can also reside, completely or at least partially, within the main memory 1204, within the static memory 1206, and/or within the processor unit 1202 during execution thereof by the architecture 1200, with the main memory 1204, the static memory 1206, and the processor unit 1202 also constituting machine-readable media.

Executable Instructions and Machine-Storage Medium

The various memories (i.e., 1204, 1206, and/or memory of the processor unit(s) 1202) and/or storage device 1216 may store one or more sets of instructions and data structures (e.g., instructions) 1224 embodying or used by any one or more of the methodologies or functions described herein. These instructions, when executed by processor unit(s) 1202 cause various operations to implement the disclosed examples.

As used herein, the terms "machine-storage medium," "device-storage medium," "computer-storage medium" (referred to collectively as "machine-storage medium 1222") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 1222 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media 1222 specifically exclude carrier waves, modulated data signals, and other such media, at least some of which are covered under the term "signal medium" discussed below.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer-Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 1224 can further be transmitted or received over a communications network 1226 using a transmission medium via the network interface device 1220 using any one of a number of well-known transfer protocols (e.g., HTTP). Examples of communication networks include a LAN, a WAN, the Internet, mobile telephone networks, plain old telephone service (POTS) networks, and wireless data networks (e.g., Wi-Fi, 3G, 4G LTE/LTE-A, 5G or WiMAX networks). The term "transmission medium" shall be taken to include any intangible medium that is capable of storing, encoding, or carrying instructions for execution by the machine, and includes digital or analog communications signals or other intangible media to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Various components are described in the present disclosure as being configured in a particular way. A component may be configured in any suitable manner. For example, a component that is or that includes a computing device may be configured with suitable software instructions that program the computing device. A component may also be configured by virtue of its hardware arrangement or in any other suitable manner.

The above description is intended to be illustrative, and not restrictive. For example, the above-described examples (or one or more aspects thereof) can be used in combination with others. Other examples can be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above Detailed Description, various features can be grouped together to streamline the disclosure. However, the claims cannot set forth every feature disclosed herein, as examples can feature a subset of said features. Further, examples can include fewer features than those disclosed in a particular example. Thus, the following claims are hereby incorporated into the Detailed Description, with each claim standing on its own as a separate example. The scope of the examples disclosed herein is to be determined with reference to the appended claims, along with the full scope of equivalents to which such claims are entitled.

Example 1 is a method for dispatching trips to a plurality of autonomous vehicles, the method comprising: deriving operational design domain (ODD) parameters for an autonomous vehicle of a first vehicle type based on trip result data, the trip result data describing a plurality of trips executed by a set of autonomous vehicles of the first vehicle type; identifying a first ODD parameter of the ODD parameters that meets a criterion; generating a first new trip based on the identified ODD parameter; selecting an autonomous vehicle to execute the first new trip; and sending, to the selected autonomous vehicle, a request to execute the first new trip.

In Example 2, the subject matter of Example 1 optionally includes wherein the identifying that the first ODD parameter meets the criterion comprises determining that the trip result data includes a number of trips including a first route segment type that is below a threshold, and the generating of the first new trip generates the first new trip to include a route segment having the first route segment type, the method further comprising: receiving a response to the request, and assigning the first ODD parameter to a value based on the response.

In Example 3, the subject matter of Example 2 optionally includes conditionally generating a first routing constraint for autonomous vehicles of the first vehicle type based on the value.

In Example 4, the subject matter of any one or more of Examples 2-3 optionally include determining the response indicates a rejection of the request; and setting a value of the first ODD parameter to indicate the rejection.

In Example 5, the subject matter of Example 4 optionally includes generating a first routing constraint to indicate use of the first route segment type is prohibited for autonomous vehicles of the first type based on the rejection of the request.

In Example 6, the subject matter of any one or more of Examples 1-5 optionally include training a model based on the trip result data; receiving a request for a second trip from an origin location to a destination location; determining from the model, a set of autonomous vehicle types based on the origin location and the destination location; selecting an autonomous vehicle type from the set; sending a request to execute the second trip to an autonomous vehicle of the selected type; receiving a response to the request; and further training the model based on the origin location, destination location, the selected autonomous vehicle type, and the response.

In Example 7, the subject matter of any one or more of Examples 1-6 optionally include wherein deriving the ODD parameters comprises: identifying a number of trips in the trip result data including a map segment of a first map segment type; and deriving a second ODD parameter based on the identified number of trips.

In Example 8, the subject matter of any one or more of Examples 1-7 optionally include wherein identifying that the first ODD parameter meets the criterion comprises: identifying a number of trips in the trip result data demonstrating a capability based on the first ODD parameter; determining the number of trips is below a threshold; and determining the first ODD parameter meets the criterion based on the determination.

In Example 9, the subject matter of any one or more of Examples 1-8 optionally include receiving a response to the request; and unconditionally canceling the request in response to receiving the response.

Example 10 is a system for dispatching trips to a plurality of autonomous vehicles, comprising: hardware processing circuitry; one or more hardware memories storing instructions that when executed configure the hardware processing circuitry to perform operations comprising: deriving operational design domain (ODD) parameters for an autonomous vehicle of a first vehicle type based on trip result data, the trip result data describing a plurality of trips executed by a set of autonomous vehicles of the first vehicle type; identifying a first ODD parameter of the ODD parameters that meets a criterion; generating a first new trip based on the identified ODD parameter; selecting an autonomous vehicle to execute the first new trip; and sending, to the selected autonomous vehicle, a request to execute the first new trip.

In Example 11, the subject matter of Example 10 optionally includes wherein the identifying that the first ODD parameter meets the criterion comprises determining that the trip result data includes a number of trips including a first route segment type that is below a threshold, and the generating of the first new trip generates the first new trip to include a route segment having the first route segment type, the operations further comprising: receiving a response to the request, and assigning the first ODD parameter to a value based on the response.

In Example 12, the subject matter of any one or more of Examples 2-11 optionally include the operations further comprising conditionally generating a first routing constraint for autonomous vehicles of the first vehicle type based on the value.

In Example 13, the subject matter of any one or more of Examples 2-12 optionally include the operations further comprising: determining the response indicates a rejection of the request; and setting a value of the first ODD parameter to indicate the rejection.

In Example 14, the subject matter of Example 13 optionally includes the operations further comprising generating a first routing constraint to indicate use of the first route segment type is prohibited for autonomous vehicles of the first type based on the rejection of the request.

In Example 15, the subject matter of any one or more of Examples 10-14 optionally include the operations further comprising: training a model based on the trip result data; receiving a request for a second trip from an origin location to a destination location; determining from the model, a set of autonomous vehicle types based on the origin location and the destination location; selecting an autonomous vehicle type from the set; sending a request to execute the second trip to an autonomous vehicle of the selected type; receiving a response to the request; and further training the model based on the origin location, destination location, the selected autonomous vehicle type, and the response.

In Example 16, the subject matter of any one or more of Examples 10-15 optionally include wherein deriving the ODD parameters comprises: identifying a number of trips in the trip result data including a map segment of a first map segment type; and deriving a second ODD parameter based on the identified number of trips.

In Example 17, the subject matter of any one or more of Examples 10-16 optionally include wherein identifying that the first ODD parameter meets the criterion comprises: identifying a number of trips in the trip result data demonstrating a capability based on the first ODD parameter; determining the number of trips is below a threshold; and determining the first ODD parameter meets the criterion based on the determination.

In Example 18, the subject matter of any one or more of Examples 10-17 optionally include the operations further comprising: receiving a response to the request; and unconditionally canceling the request in response to receiving the response.

Example 19 is a non-transitory computer readable storage medium comprising instructions that when executed configure hardware processing circuitry to perform operations for dispatching trips to a plurality of autonomous vehicles, the operations comprising: deriving operational design domain (ODD) parameters for an autonomous vehicle of a first vehicle type based on trip result data, the trip result data describing a plurality of trips executed by a set of autonomous vehicles of the first vehicle type; identifying a first ODD parameter of the ODD parameters that meets a criterion; generating a first new trip based on the identified ODD parameter; selecting an autonomous vehicle to execute the first new trip; and sending, to the selected autonomous vehicle, a request to execute the first new trip.

In Example 20, the subject matter of Example 19 optionally includes wherein the identifying that the first ODD parameter meets the criterion comprises determining that the trip result data includes a number of trips including a first route segment type that is below a threshold, and the generating of the first new trip generates the first new trip to include a route segment having the first route segment type, the operations further comprising: receiving a response to the request, and assigning the first ODD parameter to a value based on the response.

In Example 21, the subject matter of Example 20 optionally includes conditionally generating a first routing constraint for autonomous vehicles of the first vehicle type based on the value.

In Example 22, the subject matter of any one or more of Examples 20-21 optionally include determining the response indicates a rejection of the request; and setting a value of the first ODD parameter to indicate the rejection.

In Example 23, the subject matter of Example undefined optionally includes, further comprising generating a first routing constraint to indicate use of the first route segment type is prohibited for autonomous vehicles of the first type based on the rejection of the request.

In Example 24, the subject matter of any one or more of Examples 19-23 optionally include training a model based on the trip result data; receiving a request for a second trip from an origin location to a destination location; determining from the model, a set of autonomous vehicle types based on the origin location and the destination location; selecting an autonomous vehicle type from the set; sending a request to execute the second trip to an autonomous vehicle of the selected type; receiving a response to the request; and further training the model based on the origin location, destination location, the selected autonomous vehicle type, and the response.

In Example 25, the subject matter of any one or more of Examples 19-24 optionally include wherein deriving the ODD parameters comprises: identifying a number of trips in the trip result data including a map segment of a first map segment type; and deriving a second ODD parameter based on the identified number of trips.

In Example 26, the subject matter of any one or more of Examples 19-25 optionally include wherein identifying that the first ODD parameter meets the criterion comprises: identifying a number of trips in the trip result data demonstrating a capability based on the first ODD parameter; determining the number of trips is below a threshold; and determining the first ODD parameter meets the criterion based on the determination.

In Example 27, the subject matter of any one or more of Examples 19-26 optionally include receiving a response to the request; and unconditionally canceling the request in response to receiving the response.

Example 28 is an apparatus for dispatching trips to a plurality of autonomous vehicles, the apparatus comprising: means for deriving operational design domain (ODD) parameters for an autonomous vehicle of a first vehicle type based on trip result data, the trip result data describing a plurality of trips executed by a set of autonomous vehicles of the first vehicle type; means for identifying a first ODD parameter of the ODD parameters that meets a criterion; means for generating a first new trip based on the identified ODD parameter; means for selecting an autonomous vehicle to execute the first new trip; and means for sending, to the selected autonomous vehicle, a request to execute the first new trip.

In Example 29, the subject matter of Example 28 optionally includes wherein the means for identifying that the first ODD parameter meets the criterion is configured to determine that the trip result data includes a number of trips including a first route segment type that is below a threshold, and the means for generating of the first new trip is configured to generate the first new trip to include a route segment having the first route segment type, the apparatus further comprising: means for receiving a response to the request, and means for assigning the first ODD parameter to a value based on the response.

In Example 30, the subject matter of Example 29 optionally includes means for conditionally generating a first routing constraint for autonomous vehicles of the first vehicle type based on the value.

In Example 31, the subject matter of any one or more of Examples 29-30 optionally include means for determining the response indicates a rejection of the request; and means for setting a value of the first ODD parameter to indicate the rejection.

In Example 32, the subject matter of any one or more of Examples 30-31 optionally include means for generating a first routing constraint to indicate use of the first route segment type is prohibited for autonomous vehicles of the first type based on the rejection of the request.

In Example 33, the subject matter of any one or more of Examples 28-32 optionally include means for training a model based on the trip result data; means for receiving a request for a second trip from an origin location to a destination location; means for determining from the model, a set of autonomous vehicle types based on the origin location and the destination location; means for selecting an autonomous vehicle type from the set; means for sending a request to execute the second trip to an autonomous vehicle of the selected type; means for receiving a response to the request; and means for further training the model based on the origin location, destination location, the selected autonomous vehicle type, and the response.

In Example 34, the subject matter of any one or more of Examples 28-33 optionally include wherein the means for deriving the ODD parameters comprises: means for identifying a number of trips in the trip result data including a map segment of a first map segment type; and means for deriving a second ODD parameter based on the identified number of trips.

In Example 35, the subject matter of any one or more of Examples 28-34 optionally include wherein the means for identifying that the first ODD parameter meets the criterion comprises: means for identifying a number of trips in the trip result data demonstrating a capability based on the first ODD parameter; means for determining the number of trips is below a threshold; and means for determining the first ODD parameter meets the criterion based on the determination.

In Example 36, the subject matter of any one or more of Examples 28-35 optionally include means for receiving a response to the request; and means for unconditionally canceling the request in response to receiving the response.

The invention claimed is:

1. A method for dispatching trips to a plurality of autonomous vehicles, the method comprising:
receiving a passenger rating for a particular trip indicating a level of satisfaction with at least a portion of the trip executed by a given autonomous vehicle of a first vehicle type, the passenger rating being associated with a location where an event took place;
accessing trip records of other trips executed by a set of autonomous vehicles of the first vehicle type to determine that passenger ratings of the trip records correspond to the received passenger rating;
determining a commonality among the set of autonomous vehicles of the first vehicle type by determining that a threshold number of at least one of negative or positive demonstrations of a capability associated with a first operational design domain (ODD) parameter has been performed by the first vehicle type based on accessing the trip records of the other trips executed by the set of autonomous vehicles of the first vehicle type;
deriving ODD parameters for the set of autonomous vehicles of the first vehicle type based on vehicle movement data and the determined commonality among the set of autonomous vehicles, the vehicle movement data at least describing a plurality of trips comprising the other trips executed by the set of autonomous vehicles of the first vehicle type;
determining that the first ODD parameter meets a criterion;
generating a first new trip based on the first ODD parameter;
selecting an autonomous vehicle from the set of autonomous vehicles to execute the first new trip; and
sending, to the selected autonomous vehicle, a request to execute the first new trip.

2. The method of claim 1, further comprising determining that the vehicle movement data indicates a number of vehicle trips including a first route segment type that is below a threshold, and the generating of the first new trip generates the first new trip to include a route segment having the first route segment type, the method further comprising:
receiving a response to the request, and
assigning the first ODD parameter to a value based on the response.

3. The method of claim 2, further comprising conditionally generating a first routing constraint for autonomous vehicles of the first vehicle type based on the value, the first ODD parameter indicating whether the first vehicle type is capable of performing an unsupervised left turn, wherein a second ODD parameter indicates whether the first vehicle type is capable of navigating a traffic circle.

4. The method of claim 1, further comprising:
training a model based on the vehicle movement data;
receiving a request for a second trip from an origin location to a destination location;
determining from the model, a set of autonomous vehicle types based on the origin location and the destination location;
selecting an autonomous vehicle type from the set;
sending a request to execute the second trip to an autonomous vehicle of the selected type;
receiving a response to the request; and
further training the model based on the origin location, destination location, the selected autonomous vehicle type, and the response.

5. The method of claim 1, wherein deriving the ODD parameters comprises:
identifying a number of trips indicated by the vehicle movement data including a map segment of a first map segment type; and
deriving a second ODD parameter based on the identified number of trips.

6. The method of claim 1, further comprising:
identifying a number of trips indicated by the vehicle movement data that demonstrate a capability based on the first ODD parameter; and
determining the number of trips is below a threshold.

7. The method of claim 1, further comprising:
receiving a response to the request; and
unconditionally canceling the request in response to receiving the response.

8. A system for dispatching trips to a plurality of autonomous vehicles, comprising:
hardware processing circuitry; and
one or more hardware memories storing instructions that when executed configure the hardware processing circuitry to perform operations comprising:
receiving a passenger rating for a particular trip indicating a level of satisfaction with at least a portion of the trip executed by a given autonomous vehicle of a first vehicle type, the passenger rating being associated with a location where an event took place;
accessing trip records of other trips executed by a set of autonomous vehicles of the first vehicle type to determine that passenger ratings of the trip records correspond to the received passenger rating;
determining a commonality among the set of autonomous vehicles of the first vehicle type by determining that a threshold number of at least one of negative or positive demonstrations of a capability associated with a first operational design domain (ODD) parameter has been performed by the first vehicle type based on accessing the trip records of the other trips executed by the set of autonomous vehicles of the first vehicle type;

deriving ODD parameters for the set of autonomous vehicles of the first vehicle type based on vehicle movement data and the determined commonality, among the set of autonomous vehicles, the vehicle movement data at least describing a plurality of trips comprising the other trips executed by the set of autonomous vehicles of the first vehicle type;

determining that the first ODD parameter meets a criterion;

generating a first new trip based on the first ODD parameter;

selecting an autonomous vehicle from the set of autonomous vehicles to execute the first new trip; and sending, to the selected autonomous vehicle, a request to execute the first new trip.

9. The system of claim 8, the operations comprising determining that the vehicle movement data indicates a number of trips including a first route segment type that is below a threshold, and the generating of the first new trip generates the first new trip to include a route segment having the first route segment type, the operations further comprising:

receiving a response to the request, and assigning the first ODD parameter to a value based on the response.

10. The system of claim 9, the operations further comprising conditionally generating a first routing constraint for autonomous vehicles of the first vehicle type based on the value.

11. The system of claim 9, the operations further comprising:

determining the response indicates a rejection of the request; and setting the value of the first ODD parameter to indicate the rejection.

12. The system of claim 11, the operations further comprising generating a first routing constraint to indicate use of the first route segment type is prohibited for autonomous vehicles of the first type based on the rejection of the request.

13. The system of claim 8, the operations further comprising:

training a model based on the vehicle movement data;

receiving a request for a second trip from an origin location to a destination location;

determining from the model, a set of autonomous vehicle types based on the origin location and the destination location;

selecting an autonomous vehicle type from the set;

sending a request to execute the second trip to an autonomous vehicle of the selected type;

receiving a response to the request; and further training the model based on the origin location, destination location, the selected autonomous vehicle type, and the response.

14. The system of claim 8, wherein deriving the ODD parameters comprises:

identifying a number of trips indicated by the vehicle movement data that include a map segment of a first map segment type; and deriving a second ODD parameter based on the identified number of trips.

15. The system of claim 8, the operations comprising:

identifying a number of trips indicated by the vehicle movement data demonstrating a capability based on the first ODD parameter; and determining the number of trips is below a threshold.

16. The system of claim 8, the operations further comprising:

receiving a response to the request; and unconditionally canceling the request in response to receiving the response.

17. A non-transitory computer readable storage medium comprising instructions that when executed configure hardware processing circuitry to perform operations for dispatching trips to a plurality of autonomous vehicles, the operations comprising:

receiving a passenger rating for a particular trip indicating a level of satisfaction with at least a portion of the trip executed by a given autonomous vehicle of a first vehicle type, the passenger rating being associated with a location where an event took place;

accessing trip records of other trips executed by a set of autonomous vehicles of the first vehicle type to determine that passenger ratings of the trip records correspond to the received passenger rating;

determining a commonality among the set of autonomous vehicles of the first vehicle type by determining that a threshold number of at least one of negative or positive demonstrations of a capability associated with a first operational design domain (ODD) parameter has been performed by the first vehicle type based on accessing the trip records of the other trips executed by the set of autonomous vehicles of the first vehicle type;

deriving ODD parameters for the set of autonomous vehicles of the first vehicle type based on vehicle movement data and the determined commonality among the set of autonomous vehicles, the vehicle movement data at least describing a plurality of trips comprising the other trips executed by the set of autonomous vehicles of the first vehicle type;

determining that the first ODD parameter meets a criterion;

generating a first new trip based on the first ODD parameter;

selecting an autonomous vehicle from the set of autonomous vehicles to execute the first new trip; and sending, to the selected autonomous vehicle, a request to execute the first new trip.

18. The non-transitory computer readable storage medium of claim 17, the operations further comprising:

conditionally generating a first routing constraint for autonomous vehicles of the first vehicle type, the first ODD parameter indicating whether the first vehicle type is capable of performing an unsupervised left turn, wherein a second ODD parameter indicates whether the first vehicle type is capable of navigating a traffic circle.

19. The non-transitory computer readable storage medium of claim 17, the operations further comprising:

training a model based on the vehicle movement data;

receiving a request for a second trip from an origin location to a destination location;

determining from the model, a set of autonomous vehicle types based on the origin location and the destination location;

selecting an autonomous vehicle type from the set;

sending a request to execute the second trip to an autonomous vehicle of the selected type;

receiving a response to the request; and further training the model based on the origin location destination location, the selected autonomous vehicle type, and the response.

20. The non-transitory computer readable storage medium of claim 17, the operations comprising determining that the vehicle movement data indicates a number of trips including a first route segment type that is below a threshold, and the generating of the first new trip generates the first new trip to include a route segment having the first route segment type, the operations further comprising:

receiving a response to the request, and assigning the first ODD parameter to a value based on the response.

* * * * *

UNITED STATES PATENT AND TRADEMARK OFFICE
CERTIFICATE OF CORRECTION

PATENT NO. : 11,625,051 B2
APPLICATION NO. : 16/750773
DATED : April 11, 2023
INVENTOR(S) : Brent Goldman Page 1 of 1

It is certified that error appears in the above-identified patent and that said Letters Patent is hereby corrected as shown below:

In the Claims

In Column 37, Line 3, in Claim 8, delete "commonality," and insert --commonality-- therefor In Column 38, Line 63, in Claim 19, after "location", insert --,--

Signed and Sealed this
Sixth Day of June, 2023

Katherine Kelly Vidal
*Director of the United States Patent and Trademark Office*